United States Patent
Kucherov et al.

(10) Patent No.: US 11,010,059 B2
(45) Date of Patent: May 18, 2021

(54) TECHNIQUES FOR OBTAINING METADATA AND USER DATA

(71) Applicant: EMC IP Holding Company LLC, Hopkinton, MA (US)

(72) Inventors: Anton Kucherov, Dudley, MA (US); Amitai Alkalay, Kadima (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 7 days.

(21) Appl. No.: 16/525,907

(22) Filed: Jul. 30, 2019

(65) Prior Publication Data

US 2021/0034235 A1 Feb. 4, 2021

(51) Int. Cl.
*G06F 3/06* (2006.01)
*G06F 13/20* (2006.01)

(52) U.S. Cl.
CPC .............. *G06F 3/061* (2013.01); *G06F 3/067* (2013.01); *G06F 3/0655* (2013.01); *G06F 13/20* (2013.01)

(58) Field of Classification Search
CPC ........ G06F 3/061; G06F 3/0655; G06F 3/067; G06F 13/20
See application file for complete search history.

(56) References Cited

U.S. PATENT DOCUMENTS

| | | | |
|---|---|---|---|
| 10,001,953 B2 * | 6/2018 | Puthiyedath | G06F 12/00 |
| 10,552,050 B1 * | 2/2020 | Verdan | G06F 3/0611 |
| 2004/0003172 A1 * | 1/2004 | Su | G06F 3/061 711/112 |
| 2015/0339237 A1 * | 11/2015 | Heddes | G06F 12/0875 711/137 |
| 2016/0239431 A1 * | 8/2016 | Li | G06F 12/1009 |
| 2017/0139649 A1 * | 5/2017 | Puthiyedath | G06F 12/08 |
| 2018/0095661 A1 * | 4/2018 | Ananthanarayanan | G06F 3/061 |

* cited by examiner

*Primary Examiner* — Sean D Rossiter
(74) *Attorney, Agent, or Firm* — Muirhead and Saturnelli, LLC

(57) ABSTRACT

Techniques for processing I/O operations include receiving an I/O operation that accesses a target location. Metadata (MD) pages are accessed in a consecutive order to access the target location in a user data (UD) page. First processing is performed by first code. The first processing includes determining that a first MD page is not in cache; responsive to determining the first MD page is not in the cache, issuing a forwarding read command to a component to obtain pages including the first MD page and one or more other MD pages subsequent to the first MD page in the consecutive order; and receiving a response to the forwarding read command that includes the requested pages.

21 Claims, 18 Drawing Sheets

TECHNIQUES FOR OBTAINING METADATA AND USER DATA

BACKGROUND

Technical Field

This application generally relates to data storage and, more particularly, to efficient techniques for obtaining multiple pages of one or more types of data from physical storage.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for processing I/O operations comprising: receiving a read I/O operation that reads first data stored at a target location, wherein a plurality of metadata (MD) pages are accessed and read in a consecutive order to access the target location in a user data (UD) page including the first data; and performing first processing by first code, the first processing including: determining that a first MD page of the plurality of MD pages is not in cache; responsive to determining the first MD page is not in the cache, issuing a forwarding read command to a component to obtain the UD page and obtain the first MD page and any one or more other MD pages of the plurality of MD pages that are subsequent to the first MD page in the consecutive order; and receiving, by the first code from the component, a response to the forwarding read command, wherein the response includes the UD page, the first MD page, and the any one or more other MD pages subsequent to the first MD page in the consecutive order.

In at least one embodiment, 2 the plurality of MD pages are included in a linked list of MD pages, and wherein the linked list of MD pages includes the plurality of MD pages arranged in an ordering in accordance with the consecutive order. A last of the plurality of MD pages in the linked list may reference the target location in the UD page. The component may include second code stored in a memory, wherein the second code, when executed, may perform second processing that services the forwarding read command.

In at least one embodiment, the component is a physical storage device that includes the second code and the second processing performed by the component further comprises: reading the UD page, the first MD page, and the one or more other MD pages from storage media of the first physical storage device; and returning the UD page, the first MD page and the one or more other MD pages to the first code. The second code may be embedded on the physical storage device.

In at least one embodiment, the component is a controller that communicates with a plurality of physical storage devices, and wherein the controller includes the second code and the second processing performed by the component further comprises: reading the UD page, the first MD page, and the one or more other MD pages from one or more of the plurality of physical devices; and returning the UD page, the first MD page and the one or more other MD pages to the first code.

In at least one embodiment, the component is kernel code that communicates with a plurality of physical storage devices, and wherein the kernel code includes the second code and the second processing performed by the component further comprises: reading the UD page, the first MD page, and the one or more other MD pages from one or more of the plurality of physical storage devices; and returning the UD page, the first MD page and the one or more other MD pages to the first code. The kernel code and the first code may be executed by one or more processors of a data storage system, and wherein the kernel code may execute at a higher priority than the first code.

In at least one embodiment, a plurality of physical storage devices includes a first physical storage device and one or more other physical storage devices, wherein the component is the first physical storage device that communicates with the one or more other physical storage devices, and wherein the first physical storage device includes the second code and the second processing performed by the component further comprises: reading the UD page, the first MD page, and the one or more other MD pages from one or more of the plurality of physical storage devices; and returning the UD page, the first MD page and the one or more other MD pages to the first code. The first physical storage device may communicate directly with the one or more other physical storage devices over a communications bus.

In at least one embodiment, processing performed may include determining, by the first code, whether one MD page returned in the response to the forwarding read command includes invalid data, wherein the one MD page included in the response is a first version of the one MD page and a second version of the one MD page is stored in the cache, wherein the second version stored in the cache is a more recent version than the first version, wherein the second version includes second content stored at an address of interest in the one MD page stored in the cache and the first version includes first content stored at the address of interest, wherein the first content and the second content are different, and wherein the component uses the first content rather than the second content as a pointer to identify another MD page when performing processing to service the forwarding read command; responsive to determining that the one MD page of the response includes invalid data issuing, by the first code, a second forwarding read command to the component; and receiving, from the component, a second response to the second forwarding read command, wherein the second response includes a returned MD page pointed to or referenced by the second content.

In at least one embodiment, the cache may be updated to include at least some pages returned in the first response and the second response. Updating may include storing the first MD page and the UD page of the response and the returned MD page of the second response in the cache. Processing may include determining whether any page of MD or UD returned in the response to the forwarding read command includes invalid data; and responsive to determining that no page of MD or UD returned in the response to the forwarding read command includes invalid data, updating the cache to include the UD page, the first MD page and the any one or more other MD pages subsequent to the first MD page in the consecutive order.

In at least one embodiment, an I/O operation that reads or writes to a target location is received, wherein a plurality of MD pages are accessed and read in a consecutive order to access the target location in a user data (UD) page. First processing is performed by first code. The first processing includes: determining that a first MD page of the plurality of MD pages is not in cache; responsive to determining the first MD page is not in the cache, issuing a forwarding read command to a component to obtain a plurality of data pages including the first MD page and one or more other MD pages of the plurality of MD pages that are subsequent to the first MD page in the consecutive order; and receiving, by the first code from the component, a response to the forwarding read command, wherein the response includes the plurality of pages including the first MD page, and the one or more other MD pages subsequent to the first MD page in the consecutive order.

In at least one embodiment, a computer readable medium comprising code stored thereon that, when executed, performs a method of processing I/O operations comprising: receiving a write I/O operation that write first data stored at a target address, wherein a plurality of metadata (MD) pages are accessed and read in a consecutive order to access the target address in a user data (UD) page; storing the first data in a cache; and performing first processing by first code in connection with destaging the first data from the cache to an on-disk location corresponding to the target address, the first processing including: determining that a first MD page of the plurality of MD pages is not in cache; responsive to determining the first MD page is not in cache, issuing a forwarding read command to a component to obtain a plurality of pages including the first MD page and one or more other MD pages of the plurality of MD pages that are subsequent to the first MD page in the consecutive order; receiving, by the first code from the component, a response to the forwarding read command, wherein the response comprises the plurality of pages including the first MD page and the one or more other MD pages subsequent to the first MD page in the consecutive order; using the plurality of MD pages to access a data block mapped to the target address; and storing the first data in the data block mapped to the target address.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
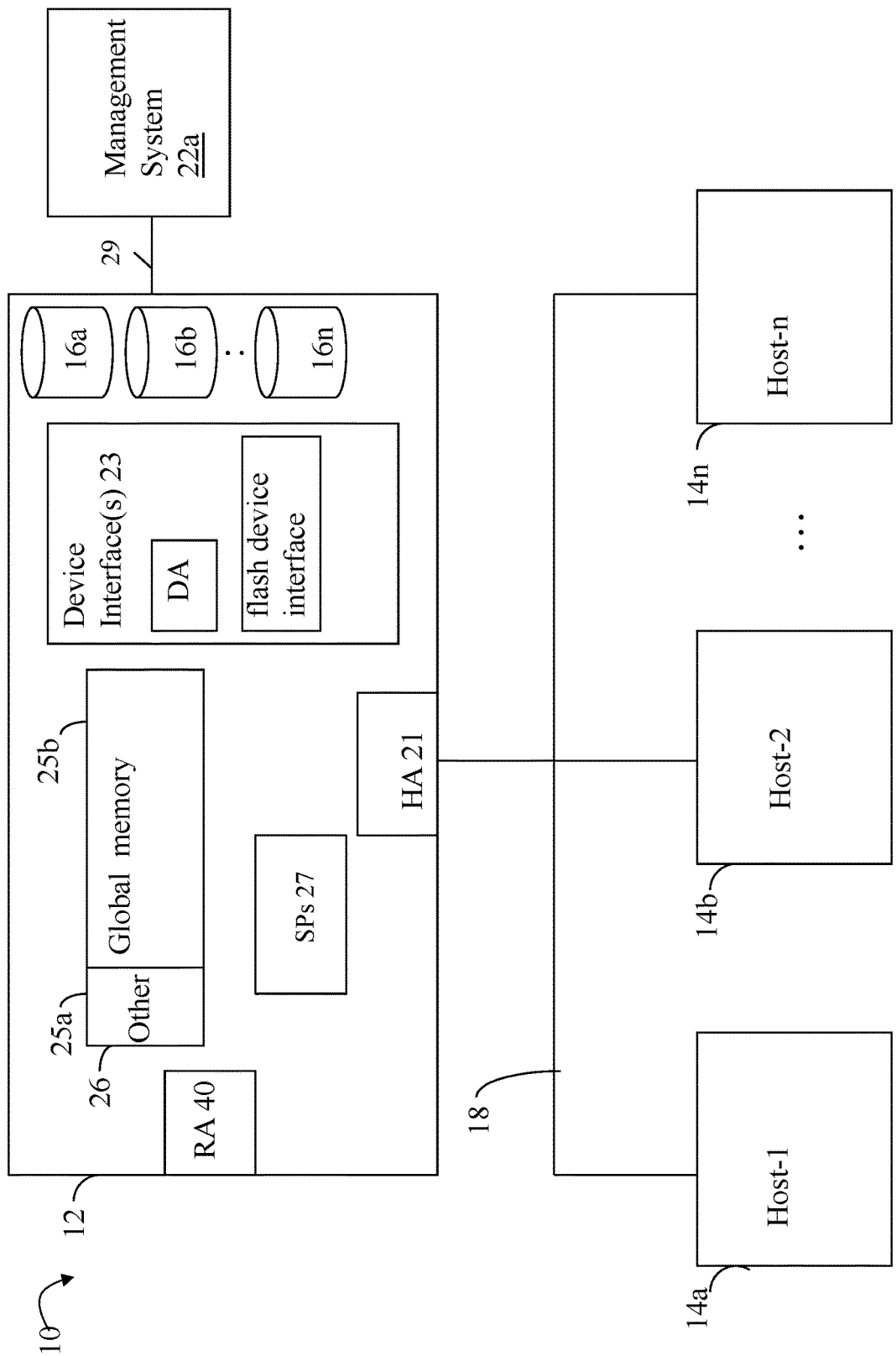
FIG. 1 is an example of components that may be included in a system in accordance with techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS), and the like. Some or all of the connections by which the hosts 14a-14n and the data storage system 12 may be connected to the communication medium 18 may pass through other communication devices, such switching equipment that may exist such as a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface or controller 23. Each of the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-14n also through the channels. The host systems 14a-14n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA, DA, RA, and the like, may be implemented as a hardware component including, for example, one or more processors, one or more forms of memory, and the like. Code may be stored in one or more of the memories of the component for performing processing.

The device interface or backend device controller, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, techniques herein may be used in connection with any suitable storage system, appliance, device, and the like, in which data is stored. For example, an embodiment may implement techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

In connection with a data storage system such as described herein, an I/O request may be a read request to read data. The read request may be received at the data storage system at a port of a front-end component of the data storage system (such as one of the HAs as described elsewhere herein). In terms of processing a read request (e.g. the read I/O path), a determination may be made as to whether all the requested read data is in cache (e.g., a cache hit where read data is stored in data cache). If so, the read request may be characterized as a read hit. In such cases of a read hit, the front-end component, such as the HA, receiving the read request may service the read request by retrieving all requested read data from the cache and returning the requested read data to the host. If all the requested read data is not in cache, the read may be characterized as a read miss (e.g., cache miss) whereby processing is performed to retrieve from physical storage any portion of the requested data that is not currently in cache. As described above, one or more DAs may perform processing to retrieve from physical storage any portion of the requested data not currently in cache. Once all the requested read data is in cache, the front-end component, such as the HA, receiving the read request may service the read request by retrieving all requested read data from the cache and returning the requested read data to the host. In this manner, a front-end component may service read requests using data that is already stored in cache prior to processing the read request, as well as using data that is brought into cache from physical storage responsive to receiving the read request.

Storing such data in cache is performed with the goal of servicing subsequent I/Os using cached data without having to retrieve the data from physical storage. In an embodiment in accordance with techniques herein, processing may be performed as just described to unconditionally cache reads as a result of a cache miss and to execute a dependent sequence of steps whereby the DA writes read miss data (retrieved from physical storage) to cache and the HA then retrieves the requested data from the cache to return to the requesting host.

In connection with write operations and write I/O path processing, write data received at the data storage system may be stored in cache and then written out later to physical storage, such as written to backend physical storage devices by a DA. Once the write data is written into cache, the data may be marked as dirty or write pending (WP) in cache denoting that the cached write data is the most recent copy of the data and needs to be destaged to backend physical storage devices. The cache location including the WP data may marked as dirty thereby indicating that the cache location includes valid data and contains the most recent copy of the data but has not yet been synchronized with the copy on physical non-volatile storage of the back end PDs. Once the write data is written to cache, the data storage system may send an acknowledgement to the host that the write operation has been completed even though the write data may not have yet been destaged from cache to the backend physical storage devices. Once the WP data has been destaged from cache to physical storage, the cache location including the write data may be characterized as clean where the cache location is valid and contains a copy of write data that has been synchronized with backend physical storage.

As data for I/Os and other processing is stored in the cache, a cache memory location, such as a cache slot or cache page, may be allocated for use in storing such data. At various points in time, there may not be any free or available cache or the amount of free or available cache may reach a minimum threshold level. In response to such conditions and possibly others, processing may be performed in connection with cache management to obtain a free or available cache location such as by evicting one or more cache pages. Generally, any suitable cache management technique known in the art may be used to manage the cache. For example, an embodiment may employ the least recently used (LRU) cache management technique which may remove data from cache based on when the data has been last referenced. For example, a time stamp may be associated with each data portion stored in the cache where the time stamp denotes the last time (e.g., date, hour, minutes, seconds in terms of wall clock time) the data portion was referenced. The most recently referenced data may have the most recent time stamp and may remain in the cache longer than other data referenced having older time stamps. The foregoing time stamps may be used to select particular data for eviction when a new cache location is needed to store new data. The foregoing time stamps may also be used in a proactive cache management technique, for example, to select data for removal when the amount of free or available cache falls below a specified amount.

Although not illustrated in FIG. 1 for simplicity, an embodiment may store additional information for cached data, such as read and write data described above that may be stored in the data cache. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the cache to retrieve and/or store data from the cache. For example, the HA may manage and/or use cache mapping information that maps a LUN and LUN offset to a cache location including data stored at the LUN offset on the particular LUN. The DA may manage and/or use cache mapping information mapping a PD and offset on the PD to a cache location including data stored at the offset on the particular PD for use in destaging write data from cache to backend non-volatile PDs 16a-n.

Data storage systems may include different storage tiers having different types of non-volatile storage media. For example, as noted above, in at least one embodiment, the data storage system may include one or more tiers of rotating disk drives and include a tier of SSD drives (e.g., flash-based storage drives). Data portions may be proactively moved or relocated between different storage tiers. For example, consider a multi-tiered storage system with 3 storage tiers—an SSD tier of flash-based drive, a tier of 15K RPM rotating disk drives and a tier of 10K RPM rotating disk drives. The foregoing 3 storage tiers may be ranked based on performance where the SSD tier may be ranked as the highest, the tier of 15K RPM drives ranked second highest and the tier of 10K RPM dries ranked lowest/least in terms of performance. A data portion, such as mapped to a subrange of a LUN logical address space, may be relocated between different ones of the foregoing 3 tiers in an automated fashion based on the temperature or frequency of access of I/Os to the data portion at various points in time. At a first point in time, the data portion may be accessed frequently for reading and/or writing and may be stored in the SSD tier. At a second later point in time, the data portion's frequency of access may be greatly reduced (e.g., idle) and may be relocated, via demotion, from the SSD tier to a lower performing tier, such as the 10K or 15K RPM tier. At yet a third point in time subsequent to the second point in time, the data portion may be frequently accessed again and may be promoted to a higher performing tier (e.g., relocated from the 10K or 15K RPM tier to the SSD tier). In at least one embodiment, the data storage system may include multiple SSD tiers of non-volatile storage where each of the SSD tiers has different characteristics that affect latency when accessing the physical storage media to read or write data.

Figure 2:
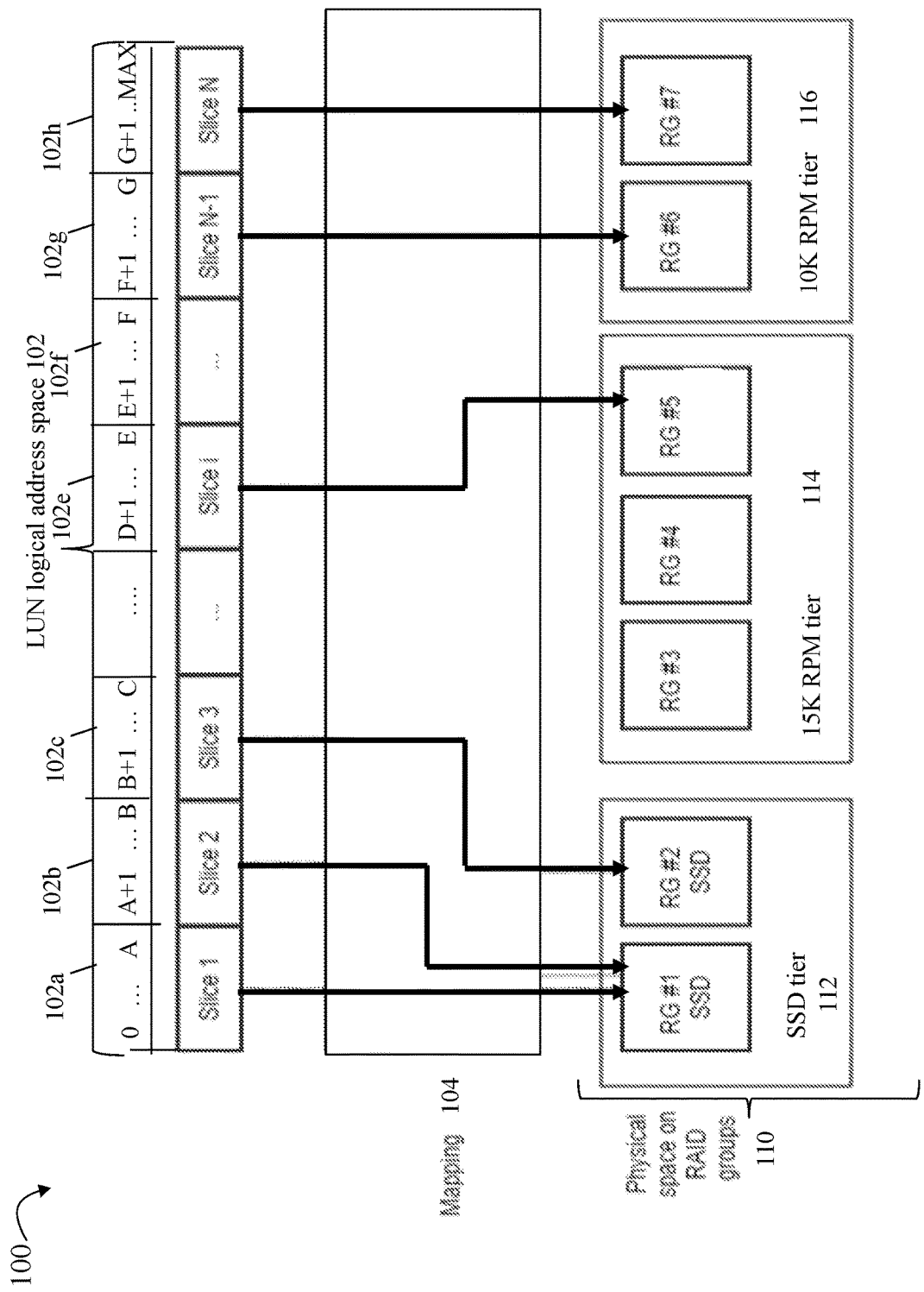
FIG. 2 is an example illustrating logical to physical mapping that may be used in an embodiment in accordance with techniques herein.

Referring to FIG. 2, shown is an example illustrating logical to physical mapping in a data storage system. The example 100 illustrates how the logical address space or range of a LUN 102 is mapped via mapping layer 104 to different slices, segments or more generally, portions of physical memory of non-volatile physical storage devices (110) providing back-end data storage, such as denoted by PDs 16a-n in FIG. 1. The example 100 include storage tiers 112 (SSD tier), 114 (15K RPM tier) and 116 (10K RPM tier) comprising the PDs 110 as noted above. Element 102 may denote the LUN's logical address space, having a starting logical address, block or offset of 0, and an ending maximum logical address, MAX. The LUN's logical address space 102 in the example 100 is partitioned into equal logical address space portions (denoted by 102a-h) where each of the portions 102a-h is mapped to region of physical storage, also referred to as slices or segments, on the different PDs of different ones of the storage tiers of 110. As noted above, data storage system software may periodically remap portions of the LUN's logical address space to keep the most actively used or accessed portions of 102a-n on slices of the highest performance tier 112 in efforts to maximum data storage system I/O performance. As shown in FIG. 2, PDs of the tiers 112, 114 and 116 may be configured into RAID groups (denoted as RG #1-7 in FIG. 2) each having a suitable RAID level to provide data protection.

In connection with user data that is written to a LUN and then stored on the PDs, or more generally, back-end non-volatile storage devices, various types of metadata (MD) may also be stored. The MD may include, for example, various structures used to access the stored user data, attributes about the LUN, and the like. To further illustrate, the MD for a LUN may include location information identifying where the user data is stored on physical storage such as disks or flash-based non-volatile storage. Consistent with discussion herein, the data storage system may receive a host I/O that reads or writes data to a target location expressed as a LUN and offset, logical address, track, etc. on the LUN. The target location is a logical LUN address that may map to a physical storage location where data stored at the logical LUN address is stored. Thus, one type of MD for an LBA of a LUN may include location MD identifying the physical storage location mapped to the particular LBA.

Figure 3:
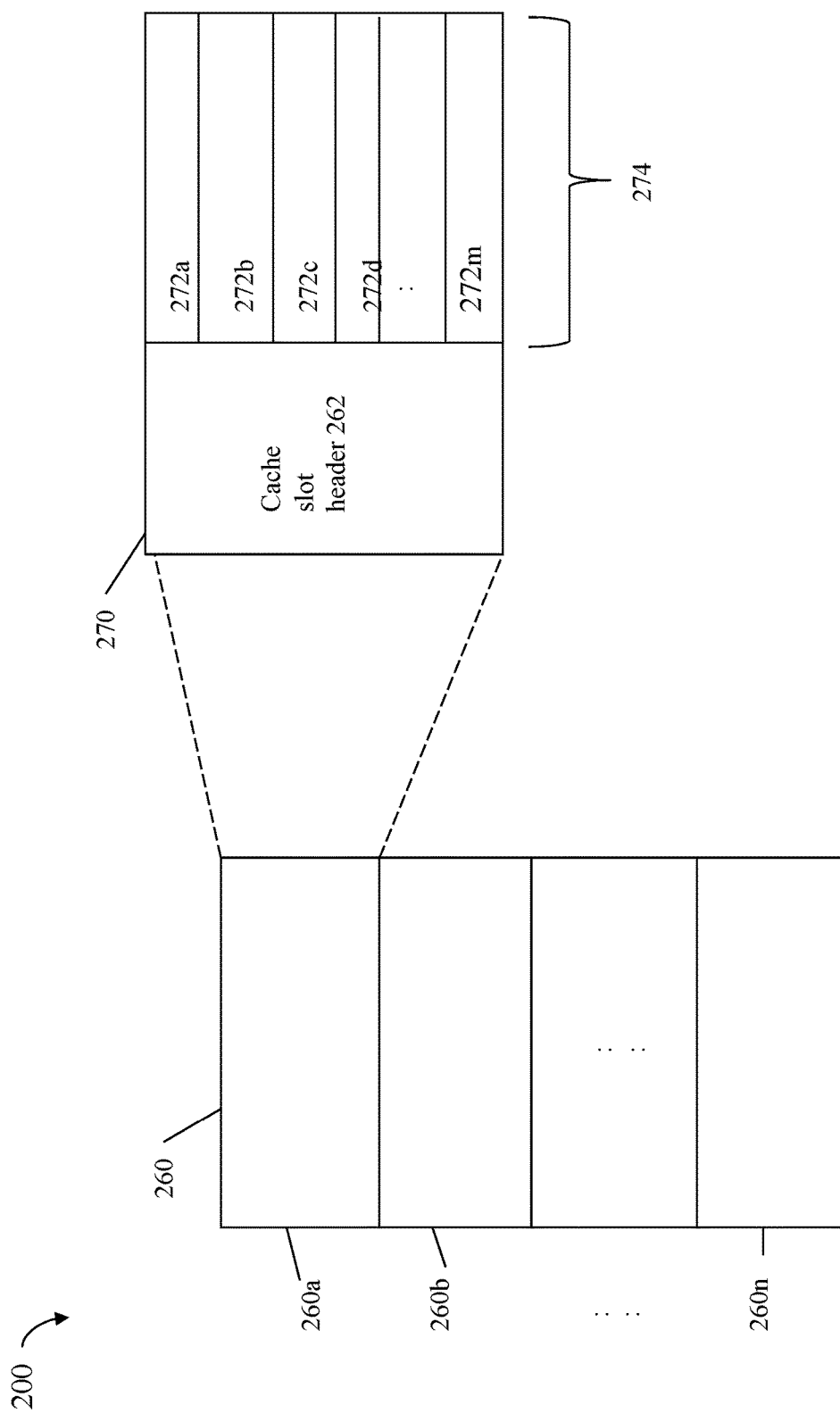
FIG. 3 is an example illustrating a logical representation of a cache in an embodiment in accordance with techniques herein.

Referring to FIG. 3, shown is an example illustrating a logical representation of a cache that may be used in an embodiment in accordance with techniques herein. In the example 200, element 260 may represent the memory or storage used as the cache which is partitioned into cache slots or pages 260a-260n. It should be noted that the example 250 is a logical representation of a cache that may be implemented using any suitable data structure(s) known in the art. Element 270 provides additional detail of single cache slot or page 260a. The cache slot or page 260a may include a cache slot or page header 262 and cache slot or page data 274. The cache slot data 274 illustrates that a single cache slot or page of data may further include multiple portions 272a-m. The cache slot header 262 may include additional information regarding the cached data stored in 274. For example, the header 272 may denote whether the data cached in each of the portions 272a-m is write pending (WP) or dirty cached data.

It should be noted that the particular granularity or smallest unit of storage for storing cached data may vary with embodiment. For example, each of the portions 272a-m may denote a smallest unit of storage for storing cached data. Additionally, the particular number of portions in a cache slot may also vary with embodiment.

When performing various data storage services or processing I/O operations that access data stored on a LUN, data read from and/or written to a LUN may be processed using the typical I/O or data path such as described herein. For example, consistent with other discussion herein, when reading data from a LUN of the data storage system, the data may be read from the LUN, stored in the cache of the data storage system, and then further read from the cache for use by one or more other components of the data storage system. For example, data may be read from a LUN in response to a read I/O from a client, such as an external host. The data may result in a cache miss wherein the requested read data is read from a backend PD and then stored in the cache. The read data stored in the cache may then be read by another component, such as a front end component that is an HA or an FA, that returns the read data from the cache to the client that issued the read I/O operation.

As noted above and elsewhere herein, MD may be used and required in order to access and read the associated user data stored on the LUN and thus provisioned storage from the backend PDs. Thus, reading the user data from the PDs includes reading MD as well as user data into the cache if such MD and user data is not already located in the cache. For example, MD describing the physical storage location for user data stored at LUN A, LBA 5 may be read from a backend PD and stored in the cache. Subsequently, the cached MD may be read to determine the physical storage location on a backend PD for the user data stored at LUN A, LBA 5. Processing may proceed to read such user data for LUN A, LBA 5 from the backend PD into the cache. However, in performing this processing, the cache of the data storage system is filled with user data and MD where such user data and MD may remain in the cache until removed based on the particular cache management policy of the cache.

Generally, it may be desirable to keep or retain in the cache as much of the MD, such as MD used to read and/or write user data stored on LUNs, as possible. Furthermore, a data storage system may generally attempt to store as much MD for all LUNs as possible in the cache. However, the cache is typically a limited resource and there may not be a sufficient amount of cache to store all the needed MD, such as for the LUN A and other LUNs of the system, in the cache. As a result, the data storage system may store the more frequently accessed MD for the LUNs in the cache with remaining MD for the LUNs stored on the backend PDs. As may be needed such as in connection with servicing I/Os, the MD for the LUNs stored on a backend PD may be loaded into the cache. In this case, a data storage system may use a paging mechanism for paging MD into cache from PDs and for storing cached MD to the PDs in order to reduce the amount of cache consumed with storing all desired the MD.

The data storage system may also use paging in connection with mapping user data stored on the PDs in and out of memory.

Paging is generally known in the art and commonly used in connection with memory management, such as for virtual memory management. In connection with virtual memory management, paging is a method of writing data to, and reading it from secondary storage, such as physical disk or other non-volatile storage, for use in primary storage, such as main memory. In a memory management system that takes advantage of paging, the operating system reads data from secondary storage in blocks or chunks that may also be referred to as pages. Since the amount of the primary storage is typically much smaller than the amount of data on secondary storage, it is not possible to store all such data in the primary storage. Thus, data may be read from secondary storage and stored in the primary storage as needed. When the primary storage no longer has available locations and another primary storage location is needed for storing new or additional data not already in primary storage, techniques may be used to select a primary storage location whereby any data in the selected primary storage location may be overwritten with the new or additional data. Prior to overwriting the selected primary storage location with the new or additional data, the current data of the selected primary storage location may be written out, as needed, to its corresponding secondary storage location (e.g., written out if the primary storage location copy is more recent or up to date than the secondary storage copy). In such a case, the current data in the selected primary location may be characterized as paged out of the primary memory (e.g., available on secondary storage but not primary storage) and the new or additional data may be characterized as paged in to the primary memory. The new or additional data is also stored on the secondary storage.

In connection with storing MD in the cache, paging may be performed in a similar manner where the primary storage is the cache and the secondary storage is the physical storage device or PDs (e.g., disk or flash-based non-volatile backend storage accessed by the DAs). Thus, MD may be retrieved from back-end PDs as needed and stored in the cache, such as for servicing read operations requesting user data associated with the MD. Once the MD is in cache, such MD may be removed from cache (e.g., evicted, removed, overwritten, paged out, and the like) as cache locations storing such MD are needed in connection with other subsequent processing. A page may refer to a single unit or amount of memory located in the cache, whereby MD stored in each page in the cache may be brought into the cache (e.g., paged into the cache) and also paged out of (e.g., evicted from) the cache as may be needed. Various techniques may be used for general cache management (e.g., eviction policy for selecting data of cache slots for removal from cache, flushing policy for determining when and/or how much write pending data to flush from cache to non-volatile storage, and the like).

In at least one embodiment, a page table may be used to map or perform address translations of a physical storage location or address of a MD page on a PD (e.g., also sometimes referred to as an on-disk address or location) to a cache address or location, if that particular MD page is currently loaded in cache. Thus, the page table may be queried to return a cache location of a desired MD page based on the physical location or address of the MD page as stored on a back-end PD. If the particular MD page having a specified physical location on a PD is not currently stored in cache, the page table will not contain any mapping to a corresponding cache location. In such a case, a read or cache miss results as described elsewhere herein. Responsive to the read or cache miss with respect to a particular MD page located at a particular on-disk address or location, processing may be performed to page in the MD page (e.g., read the MD page from physical storage of the PD and store the MD page in cache).

In some systems, multiple MD pages referencing or pointing to each other may need to be accessed in a particular order and read in a serialized manner in order to ultimately access the desired user data referenced by the final MD page. In such a case, all the multiple MD pages need to be in cache or otherwise paged in from PDs in order to access the UD, which may or may not also be in cache and thus may also need to be paged into the cache. Thus, a cache miss may occur for each MD page of the multiple MD pages required as well as for the user data page. Such occurrences of cache misses for the MD pages and/or user data results in delays and elongated I/O response times due to the added drive latency in accessing the needed MD and/or user data from the PDs. Also, the cache misses for the MD pages and/or user data incur added latency in connection with the scheduling of processing tasks. For example, a process or task executing on a main CPU or processor (e.g., one of the SPs 27) of the data storage system may perform processing to read a MD page. If the MD page is not in cache, a read is issued such as to a PD to obtain the MD page and store it in the cache. The process or task may asynchronously wait for the MD page to be retrieved from the PD and stored in the cache. Once the MD page is in the cache, the waiting process or task may be awakened by code of the operating system executing on the data storage system. The awakened process or task may then be placed in the scheduling queue for execution. Once the process or task executes again, the cached MD page is accessed by the process or task to obtain a pointer or reference to the next MD page of the multiple MD page sequence which may also result in a cache miss. In such a case, the foregoing processing steps may be repeated multiple times with respect to cache misses for the sequence of multiple MD pages until the user data, as referenced by the last MD page in the sequence of MD pages, is obtained. The foregoing processing performed such as for the task to asynchronously wait for the requested page, and then awakening and scheduling the waiting task for execution also adds additional latency to the I/O response time when servicing an I/O operation to read and/or write the user data.

Described in following paragraphs are techniques that may be used to reduce the latency incurred in connection with accessing user data. In particular, such techniques described in following paragraphs may be used to reduce the additional latency incurred in connection with the additional scheduling overhead as noted above due to possible cache misses that may occur with respect to the multiple MD pages needed to ultimately access (e.g., read) or store (e.g., write) the user data.

In at least one embodiment, a special read command, also referred to herein as a forwarding read or forwarding read command, may be issued by a process or task to obtain, from backend PDs, a particular user data (UD) page and also the multiple MD pages accessed to obtain the UD page (e.g., obtain the on-disk copies of the UD page and multiple MD pages accessed to read the UD page). Multiple MD pages may be accessed in a particular order denoted by a sequence in order to read a particular UD page. In at least one embodiment, the forwarding read command may be issued to read, from one or more non-volatile backend storage PDs, the UD page and also one or more MD pages from a particular point in the sequence of MD pages used to access the UD page. For example, upon an occurrence of a cache miss for the first MD page in a sequence of MD pages needed to read a particular UD page, a forwarding read command may be issued to return the on-disk copies (as stored on the PDs) of the UD page and all MD pages in the sequence of MD pages needed to access the UD page. As another example, a UD page may be read by accessing 4 MD pages in a particular order forming a sequence. Responsive to a cache miss for the $3^{rd}$ MD page in the sequence of 4 MD pages needed to read the UD page, a forwarding read command may be issued. The forwarding read command may request to return an on-disk copy of the UD page, and return on-disk copies for only the last 2 MD pages (e.g., MD pages 3 and 4) accessed in the sequence. The code, such as a process or task, that issued the forwarding read, may receive all the requested on disk copies of the MD and UD pages in response to the single forwarding read command. In at least one embodiment, the code issuing the forwarding read command may be microcode or firmware executed by a processor of the data storage system. In at least one embodiment where the forwarding read is issued by the microcode executed by a processor of the data storage system, the amount of required scheduling by the operating system of the microcode may be reduced to a single scheduling cycle or instance for the single forwarding read command issued.

In at least one embodiment, the forwarding read command may be implemented using hardware and/or software included in each single PD. For example, the forwarding read command may be implemented by code included in firmware embedded or located in a PD where the firmware code is executed by a processor also located in the PD. The microcode executing on the data storage system may issue the forwarding read command to the PD to obtain on-disk copies of the MD pages of the MD sequence and the UD page as stored on the single PD. The processor and firmware of the PD may handle all the processing needed to read each on-disk copy of a MD page in the sequence and also the on-disk copy of the UD page from the non-volatile storage media of the PD. The PD may then return the requested on-disk copies of the MD pages of the sequence and the on-disk copy of the UD page to the microcode executing on the data storage system. In this manner, the microcode executing on a processor of the data storage system may only experience a single overhead scheduling cycle associated with issuing the forwarding read command as opposed to multiple such scheduling cycles that would otherwise be experienced for the multiple cache page misses (e.g., cache misses for MD and UD pages).

In at least one embodiment, the forwarding read command may be implemented using hardware and/or software included in a controller that communicates with one or more PDs. In such an embodiment, the microcode executing on the data storage system may issue the forwarding read command to the controller to obtain on-disk copies of the MD pages of the sequence and the UD as stored on any or more of the PDs connected to and in communication with the controller. A processor and firmware of the controller may handle all the processing needed to read the on-disk copy of each MD page in the sequence and also the on-disk copy of the UD page from the non-volatile storage media of any of the PDs connected to, and in communication with, the controller. The controller may then return the requested on-disk copies of the MD pages of the sequence and the on-disk copy of the UD to the microcode executing on the data storage system. In this manner, the microcode executing on a processor of the data storage system may only experience a single overhead scheduling cycle associated with issuing the forwarding read command as opposed to multiple such scheduling cycles that would otherwise be experienced for the multiple cache page misses (e.g. cache misses for MD and UD pages).

In at least one embodiment, the forwarding read command may be implemented using kernel code that executes at an elevated or privileged execution level. The kernel code may communicate with one or more PDs to obtain the on-disk copies of the requested MD pages and UD page. In such an embodiment, the microcode executing on the data storage system may issue the forwarding read command to the kernel code, such as using an API (application processing interface), to obtain on-disk copies of the MD pages of the sequence and the on-disk copy of the UD page as stored on any or more of the PDs. The microcode may be executing in a non-privileged or non-kernel mode. The kernel code may execute on a processor (e.g., one of the SPs 27) of the data storage system in an elevated or kernel mode of execution whereby the operating system provides higher execution priority for the kernel code than the priority of execution of the microcode issuing the forwarding read command. The kernel code may handle processing needed to read each on-disk copy of the MD page in the sequence that is requested and also the on-disk copy of the UD page from the non-volatile storage media of any of the PDs in the data storage system. For example, in at least one embodiment in which each of the PDs included embedded code in firmware to implement the forwarding read command, the kernel code may communicate with one of more of such PDs to obtain the on-disk copies of the requested MD and UD pages as stored on such PDs. The kernel code may then return the requested on disk copies of MD pages of the sequence and the UD, as read from the PDs, to the microcode executing on the data storage system. In at least one embodiment when the kernel code includes code that implements the forwarding read command processing, the PDs storing the on-disk copies of the requested pages do not required any additional code for use in connection with the forwarding read command processing. In this manner, the microcode executing on a processor of the data storage system may only experience a single overhead scheduling cycle associated with issuing the forwarding read command as opposed to multiple such scheduling cycles that would otherwise be experienced for the multiple cache page misses (e.g. cache misses for MD and UD pages).

In at least one embodiment, once the microcode executing on the data storage system receives the on-disk copies of the requested MD pages and UD page in response to the forwarding read command, the microcode may perform processing that stores the on-disk copies of the requested MD pages and the UD page in the cache. As discussed in more detail elsewhere herein, the on-disk copies of the pages read from the PDs and returned in response to the forwarding read command may be stored in the cache, as needed, by the microcode depending on whether the cache already includes dirty cached copies of any of the returned pages.

Following description makes reference to the techniques herein as applied for use in connection with a forwarding read command used in connection with processing read I/Os or commands to read data. More generally, the techniques herein may be used in connection with any suitable I/O or data operation performed with respect to data. For example, the techniques herein may also be used in connection with write I/Os or commands that write data rather than read data.

The foregoing and other aspects of the techniques herein are described in more detail in following paragraphs and figures.

Figure 4:
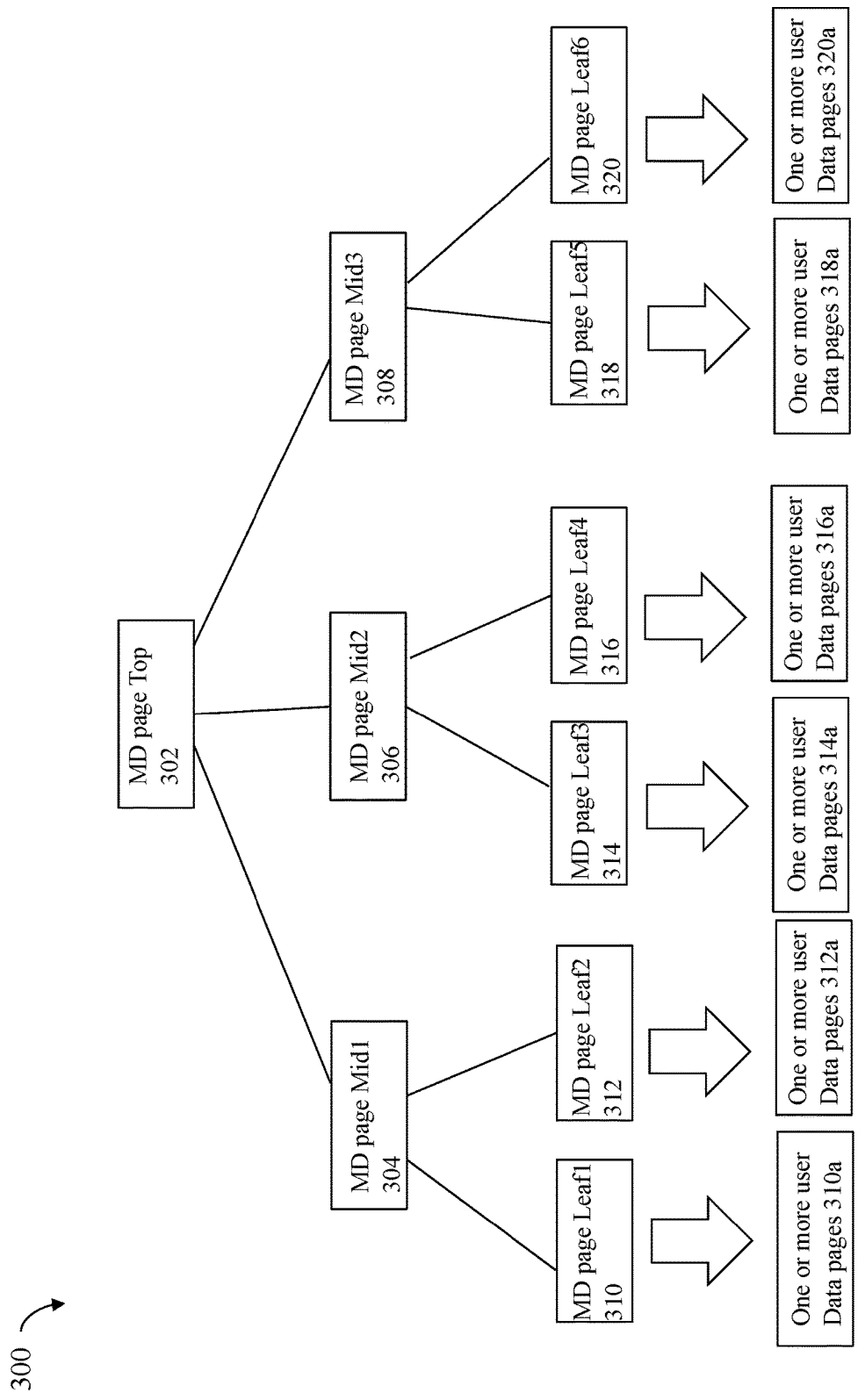
FIGS. 4 and 5A are examples illustrating a tree of MD pages that may be used in an embodiment in accordance with the techniques herein.

In at least one embodiment, the MD for a LUN, such as the LUN A noted above, may be in the form of a tree having a plurality of levels. More generally, the MD may be in the form of any ordered list or hierarchical structure. In at least one embodiment, the MD for the LUN A may be in the form of a tree having 3 levels including a single top or root node, a single mid-level and a bottom level of leaf nodes, where each of the MD page leaf nodes may point to, or reference (directly or indirectly) one or more pages of stored data, such as user data stored on the LUN A. Each node in the tree may correspond to a MD page including MD for the LUN A. More generally, the tree or other hierarchical structure of various MD pages for the LUN A may include any suitable number of levels, such as more than 3 levels where there are multiple mid-levels. In at least one embodiment the tree of MD pages for the LUN may be a B+ tree, also sometimes referred to as an "N-ary" tree, where "N" indicates that each node in the tree structure may have up to a maximum of N child nodes. For example, in at least one embodiment, the tree of MD pages for the LUN may specify N=512 whereby each node in the tree structure may have up to a maximum of N child nodes. For simplicity of illustration, the tree structure of MD pages is represented in FIG. 4 as including only 3 levels where each node in the tree may have at most 3 child nodes. Generally, the techniques herein may be used with any layered or hierarchical structure of MD pages.

Referring to FIG. 4, shown is an example of a tree of MD pages that may be used in an embodiment in accordance with the techniques herein. The example 300 includes a tree of MD pages as noted above with 3 levels—a top or root level, level 1, including a single MD page; a single mid or middle level, level 2, of MD pages; and a bottom level, level 3, of leaf nodes of MD pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which may also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages (e.g., pages of data stored on the LUN A 254). For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node may include a reference used to access (directly or indirectly) each of its one or more child nodes. For example, the root node MD page top 302 may include addresses or pointers used to access each of its child nodes 304, 306 and 308. The mid-level node MD page mid1 304 may include addresses or pointers used to access each of its child leaf nodes 310, 312. The mid-level node MD page mid1 306 may include addresses or pointers used to access each of its child leaf nodes 314, 316. The mid-level node MD page mid1 308 may include addresses or pointers used to access each of its child leaf nodes 318, 320.

In at least one embodiment, each of the addresses or pointers included in a MD page that references a location in another MD page or references a location in a UD page may be a physical storage location on the back-end PDs. Consistent with discussion elsewhere herein, a page table may be used to map each such on-disk address or pointer included in a MD page to a corresponding cache location or address, if the particular MD page is currently stored in cache. Thus, the traversal between connected nodes of the structure 300 may correspond to traversing physical address or storage locations included in pages or nodes that are parent nodes.

In connection with accessing a particular UD page in at least one embodiment, all MD pages in a path from the root or top level of the tree to the UD page may be required to be traversed in a consecutive serialized order in which such pages appear in the path traversal down the path from the top or root level to the UD page accessed using a particular one of the MD page leaf nodes. For example, assume UD page X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages may include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 may generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

As noted elsewhere herein, the data pages 310a, 312a, 314a, 316a, 318a and 320a include UD stored on particular logical addresses of a LUN's address space, such as the LUN A's logical address space. In at least one embodiment each MD leaf may hold MD for a specified number of LBAs of a LUN. For example, in one embodiment each MD leaf may hold MD for 512 LBAs. For example, with reference to FIG. 4 and as noted elsewhere herein, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page may vary with embodiment. For example, in at least one embodiment, consecutive sequential subranges of the LUN's logical address space may be mapped to the MD page leaves. Additionally, when the tree is traversed in a depth first manner, the MD page leaves may correspond to consecutive sequential subranges. For example, element 310a denotes data pages for LBAs 0-511 and 312a denotes data pages for the LBAs 512-1023; element 314a denotes data pages for LBAs 1024-1535; element 316a denotes data pages for LBAs 1536-2047, and so on.

As generally known in the art, a depth-first search (DFS) is an algorithm for traversing or searching tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner based on a DFS explores all paths, in sequential order, from the left-most path to the right most path as arranged in the tree. In at least one embodiment, when the structure 300 is traversed in this depth first manner, the MD page leaf nodes that occur in the DFS traversal correspond to consecutive sequential LBA subranges of a LUN. However, the techniques described herein are not limited to any particular correspondence between the LUN LBAs and the different MD page leaves.

In at least one embodiment, when the overall tree including MD page top node 302 and all its descendant nodes are traversed in this depth first manner, the MD page leaf nodes that occur in the DFS traversal correspond to consecutive sequential LBA subranges of a LUN.

In at least one embodiment as described herein, each of the MD pages and data blocks in the example 300 may be of a predetermined size and each of the MD pages may hold a known number of entries containing pointer or address values. In such a case and in combination with the correspondence of sequential consecutive LBA ranges of each MD leaf page, an embodiment may perform a calculation to determine the MD page at a particular level that is accessed in the tree MD mapping structure 600 to determine the data block for a particular LUN and LBA. Similarly, it is a straightforward mathematical calculation to determine the index, offset of entry in a particular page or node to be accessed in connection with obtaining data blocks stored at the particular LUN and LBA. Each MD page in 300 may be known to include MD relevant for accessing data on a particular LUN and one or more LBAs of that LUN. For example, consistent with discussion above, element 310a denotes the data blocks for LBAs 0-511 of a LUN. In order to access the data block for an LBA of the LUN in the LBA subrange 0-511, MD pages 302, 304 and 310 may be traversed in sequential order. In particular, the first entry or offset of the MD page top 302 may contain the address of the MD page mid 1 304; the first entry or offset of the MD page mid 1 304 may contain the address of the MD page leaf 1 310; and the first entry or offset of the MD page leaf 1 310 may contain the address of the data blocks for 310a.

In a similar manner, a mapping may be made regarding what MD pages of the structure 300 and entries thereof are used in connection with obtaining data blocks containing data for any particular LUN and LBA, or more generally, any FS logical address. In at least one embodiment, the particular MD pages used to access a data block including data for a particular LUN and LBA may be known based on such mappings and correspondence of LBA subranges to particular MD leaf pages.

Figure 5A:
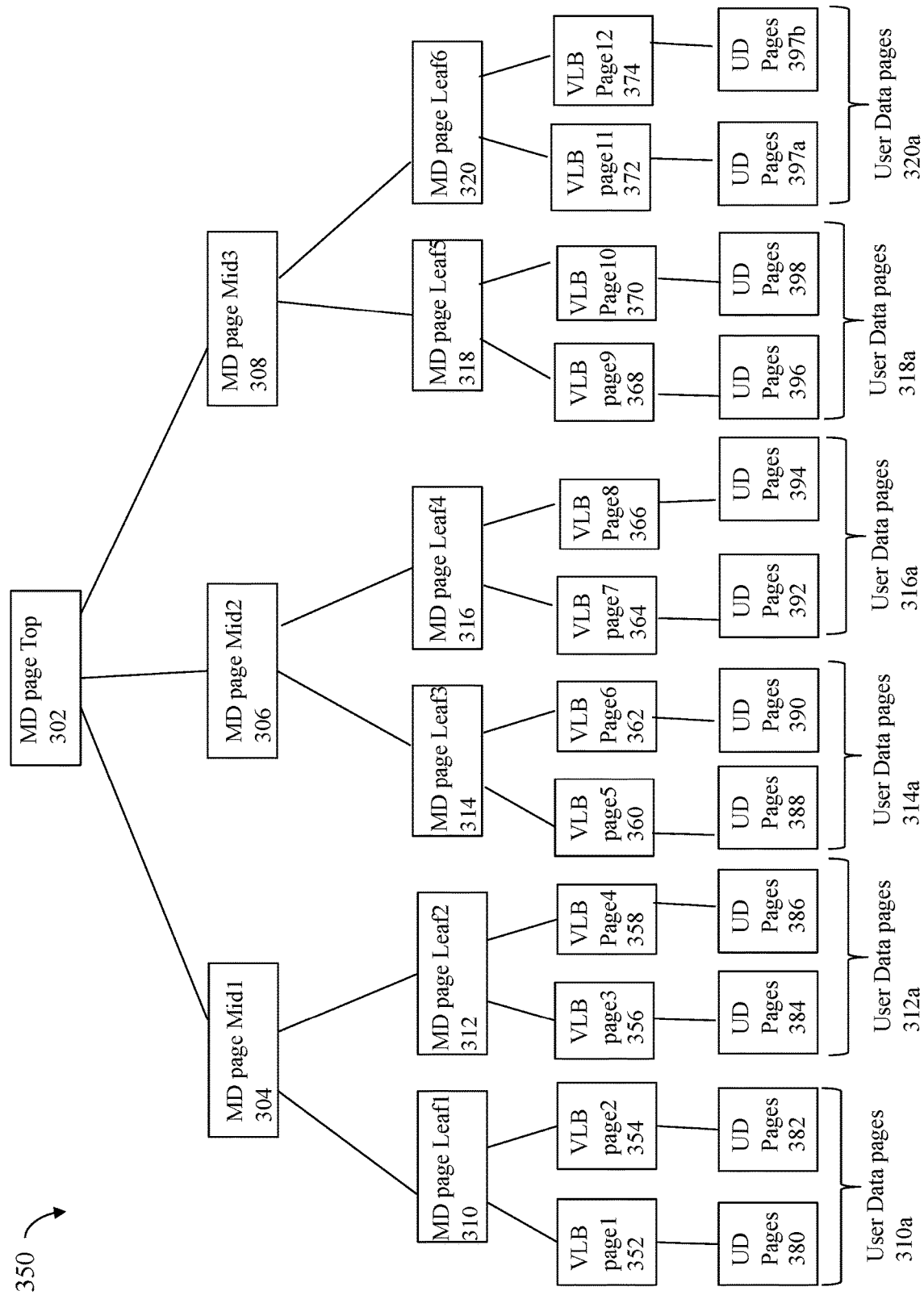

Referring to FIG. 5A, shown is a more detailed version of a hierarchical structure that may be used in an embodiment in accordance with the techniques herein. The structure 350 is similar to the structure 300 as described and illustrated in FIG. 4 with the added difference that more detail is provided regarding the intervening layer of VLB (virtual layer block) MD pages between the MD page leaves and the UD pages. Thus, in such an embodiment, the structure 350 includes 4 levels of MD pages as opposed to the possible 3 levels as allowed in the more generalized structure 300 represented in FIG. 4. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages may be used to facilitate different data storage services, such as relocating UD between different physical storage location, data deduplication, and the like. The VLB associated with a particular physical storage location may be remapped without requiring remapping of a MD leaf to the UD page.

UD pages 380 and 382 denote two portions of UD pages corresponding to UD pages 310a of FIG. 4 including data for LBAs 0-511. UD pages 384 and 386 denote two portions of UD pages corresponding to UD pages 312a of FIG. 4 including data for LBAs 512-1023. UD pages 388 and 390 denote two portions of UD pages corresponding to UD pages 314a of FIG. 4 including data for LBAs 1024-1535. UD pages 392 and 394 denote two portions of UD pages corresponding to UD pages 316a of FIG. 4 including data for LBAs 1536-2047. UD pages 396 and 398 denote two portions of UD pages corresponding to UD pages 318a of FIG. 4 including data for LBAs 2048-2559. UD pages 397a and 397b denote two portions of UD pages corresponding to UD pages 320a of FIG. 4 including data for LBAs 2560-3072.

In furtherance of the example above regarding UD page X and now with reference to FIG. 5A, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5B:
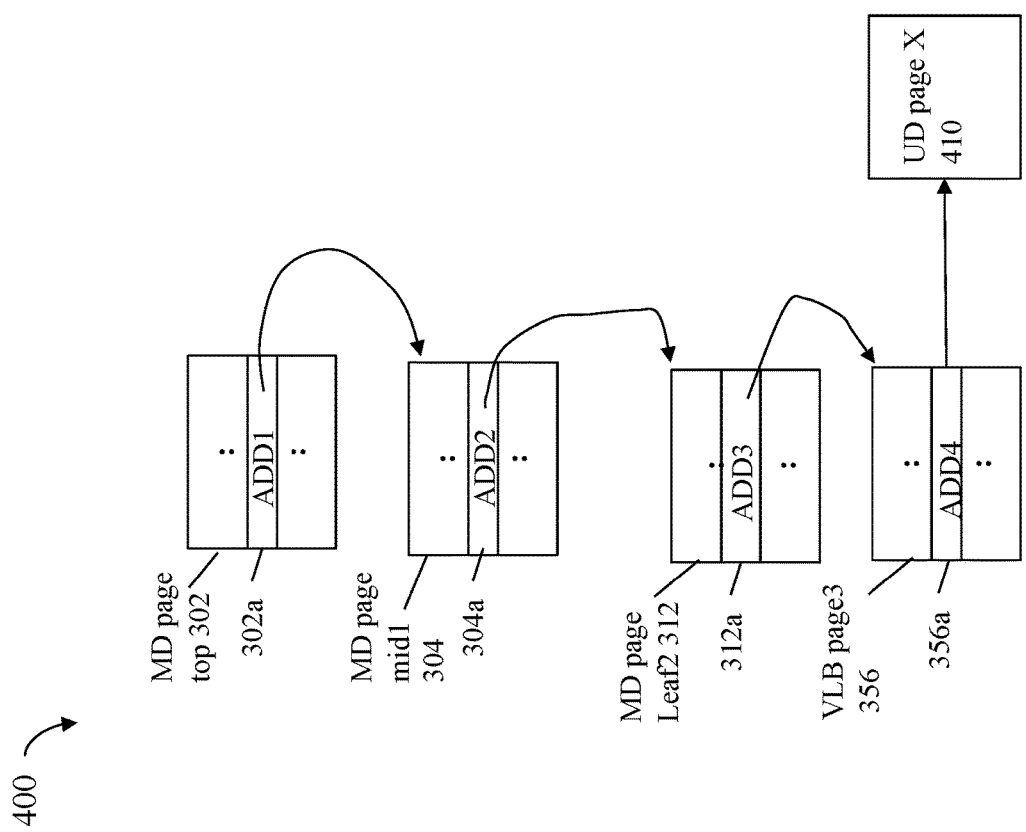
FIG. 5B is an example illustrating a path of pages of the structure of the FIG. 5A traversed in an embodiment accordance with the techniques herein.

Referring to FIG. 5B, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the location 304a in the MD page mid1 304. In at least one embodiment, the starting entry 302a in the first MD page 302 of the sequence may be determined based on the logical address including the desired UD. For example, assume processing is performed to read the UD for LUN A, LBA 514 located in UD page X. In at least one embodiment, the logical address LUN A, LBA 514 may be used to determine the particular structure instance and thus the particular MD page top 302 to access. The LBA 514 of the logical address of the UD may also be used to determine an index or offset into the MD page 302 to determine the relevant entry, location or address 302a having a pointer, address or reference to the next MD page in the sequence to access the desired page including the UD for LUN A, LBA 514. An embodiment generally may use any suitable technique to map a corresponding logical address, such as an LBA of a particular LUN, to an entry in the top level MD page 302.

If not already located in the cache, the on-disk copy of the MD page top 302 may be accessed and read from a PD to obtain the address or pointer ADD1 from location 302a. If the MD page 302 is already in cache, the cached copy may be used to obtain the address or pointer ADD1 from the location 302a. The address or pointer ADD1 of location 302a may then be used to identify a particular mid level MD page, such as MD page mid1 304, that is accessed next in the sequence.

It should be noted that in at least one embodiment, an entry of a first MD page may identify a location, offset, pointer or address to a second MD page or a UD page. The location, offset, address or pointer (e.g., ADD1, ADD2, ADD3 and ADD4 of FIG. 5B) in the entry of a first MD page may identify the physical storage address or location on a particular PD for another second MD page. As discussed herein, when traversing the linked list of pages in the example 400, processing may include using a page table to map an on-disk or physical address to a corresponding address or location in cache, if the page including the on-disk or physical address is currently in the cache. Thus, the page table may be used to determine if a particular page including a specified on-disk physical address is stored in cache, and if so, identify the cache location or address including the content of the specified on-disk physical address. If the page is not in cache, processing may be performed to read the on-disk copy of the desired page from a PD to obtain the pointer or address (e.g., on-disk or physical address) of the next page in the linked list.

Continuing with the example 400, the MD page mid1 304 may be accessed where the location 304a is read to obtain the address or pointer ADD2 from location 304a. The address or pointer ADD2 may then be used to identify a particular leaf level MD page, such as MD page leaf2 312, that is next accessed in the sequence. If the MD page mid1 304 is not in cache, the on-disk copy of the MD page 304 on a PD may be accessed to read the address or pointer ADD2 from the location 304a. The address or pointer ADD2 identifies location 312a of the MD page leaf 2 312. If the MD page 312 is not already in cache, the on-disk copy of the MD page 312 on a PD may be read to obtain the content of location 312a. The location 312a of the MD page leaf2 312 may be accessed and read to obtain the address or pointer ADD3 from location 312a. The address or pointer ADD3 may then be used to identify a particular VLB page, such as VLB page3 356, that is next accessed in the sequence. If the VLB page 356 is not already in cache, the on-disk copy of the VLB page 356 on a PD may be read to obtain the content of location 356a. The location 356a of the VLB page 3 356 may be accessed and read to obtain the address or pointer ADD4 from the location 356a. The address or pointer ADD4 may then be used to identify the particular UD page X 410 where the UD page X may next be read. If the UD page X is not in cache, the on-disk copy of the UD page X may be read in from a PD.

The example 400 of FIG. 5B includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

In at least one embodiment in accordance with the techniques herein, a process or task, or more generally, first code executing on a processor (e.g., one of the SPs 27) of the data storage system may determine a MD page of the MD sequence that is not in the cache thereby causing a read miss where the on-disk copy of the MD page needs to be read from a back-end PD. Upon the occurrence of a first cache miss with respect to a MD page of the sequence, the first code may issue a forwarding read command to a component which implements the forwarding read command. The component implementing the forwarding read command may be a hardware component with embedded code that performs processing to implement the forwarding read command. In at least one embodiment, the hardware component may be a single PD where the embedded code is included in microcode or firmware on the PD. As a variation, in at least one embodiment, the hardware component may be a controller where the embedded code is included in microcode or firmware on the controller that communicates to multiple PDs. The component implementing the forwarding read command may alternatively be a software component, such as kernel code, that performs processing to implement the forwarding read command. In embodiments where the code implementing the forwarding read command is included in a controller or kernel code, the controller and the kernel code may more generally be characterized as intermediate components that implement the forwarding read command whereby the intermediate component then communicates with one or more PDs to obtain on-disk copies of the desired MD and UD pages.

The processing performed by the forwarding read command may be illustrated with reference to FIG. 5B. In this case, assume the first code as noted above is executing on a processor of the data storage system. The example 400 includes the pages 302, 304, 312, 356 and 410 of the path traversed in the hierarchical structure of FIG. 5A to read a particular portion of UD included in the UD page X 410. The sequence of MD pages consecutively accessed in a serialized manner is denoted by the pages 302, 304, 312 and 356 of the path. If the first code determines the UD page 410 (including the desired UD for the target logical address of LUN A, LBA 514) is not in cache, the first code begins traversal of the MD pages in the path. The first code determines a first address or location 302a within the MD page top 302 for the target logical address containing the desired UD. Assuming the MD page 302 is in cache (cache hit), the first code accesses the first address or location 302a that points to a second address or location 304a of the MD page mid1 304. Upon trying to access the second address or location 304a, a cache miss occurs since MD page 304 is not in cache. In this case, the first code may then issue a forwarding read command to read on-disk copies of:

the particular MD page 304 that caused the cache miss;
the remaining MD pages 312 and 356 subsequent to MD page 304 in the sequence and path; and
the UD page 410.

Upon the occurrence of a cache miss with respect to a first MD page of the path (e.g., from the MD page top to the UD page), the issuance of the forwarding read command requests on-disk copies of all pages in the path beginning with the page that caused the cache miss. Put another way, the issuance of the forwarding read command requests on-disk copies of the UD page and also all MD pages in the MD page sequence beginning with the MD page that caused the cache miss. Put yet another way with reference to the ordered linked list of pages of the FIG. 5B, the forwarding read command requests on-disk copies of all pages in the linked list from a particular page or point in the list onward or forward.

In at least one embodiment, once a particular MD page of the traversal denoted by the path that is not in the cache, it is highly likely that any subsequent MD and UD pages of the path are also not in the cache. The foregoing is based on expected behavior of page reference sequences and LRU cache management. In particular, assume that at a first point in time a first UD page was read where a first sequence of MD pages are accessed in order to read UD of the first UD page. At the first point in time, all such MD pages of the first sequence and also the first UD page may be in cache in order to service a read accessing data of the first UD page. Thus, if one MD page of the first sequence is not in the cache, it is likely that the remaining subsequent MD pages of the first sequence are also not in the cache.

Figure 6:
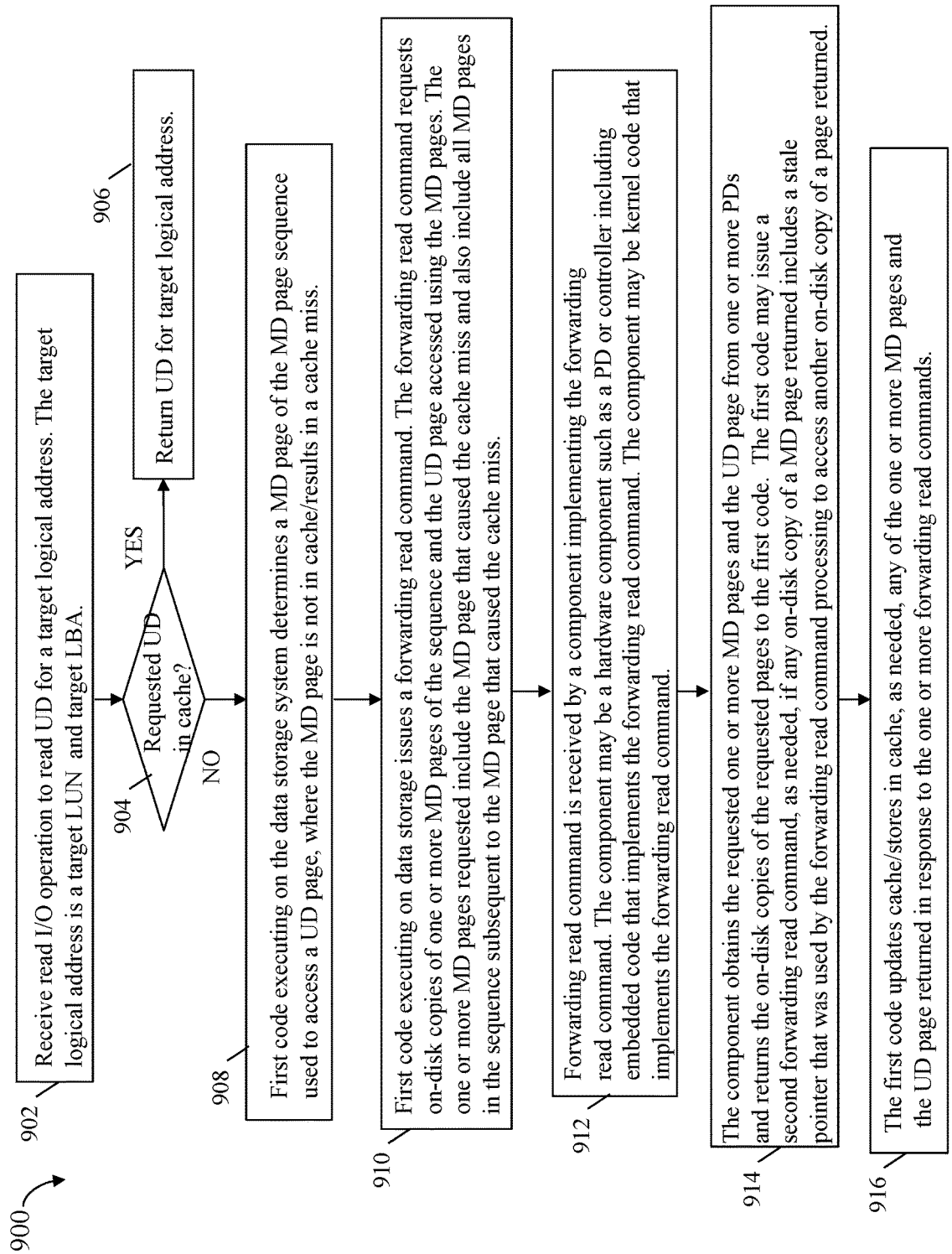
FIGS. 6, 11, 12, 13, 14, 15, 16 and 17 are flowcharts of processing steps that may be performed in an embodiment in accordance with the techniques herein.

Referring to FIG. 6, shown is a flowchart of processing steps that may be performed in an embodiment in accordance with the techniques herein. The flowchart 900 summarizes processing just described in connection with overall flow between the first code and the component implementing the forwarding read command.

At the step 902, a read I/O operation is received to read UD for a target logical device. The target logical address may be a target LUN and target LBA. From the step 902, control proceeds to the step 904. At the step 904, a determination is made such as by the first code executing on the data storage system as to whether the requested UD for the target logical address is in cache. If step 904, evaluates to yes, control proceeds to the step 906 where processing is performed to return the UD for the target logical address. If the step 904 evaluates to no, control proceeds to the step 908. If the step 904 evaluates to no, it means that the first code experiences a cache miss with respect to the requested UD for the target logical address.

At the step 908, the first code executing on the data storage system begins traversal of the MD sequence of MD pages in order to access the UD page including the desired UD for the target logical address. During such traversal in the step 908, the first code experiences a cache miss with respect to one of the MD pages of the sequence. In response to the MD page cache miss of step 908, control proceeds to the step 910. At the step 910, the first code executing on data storage issues a forwarding read command. The forwarding read command requests on-disk copies of the one or more MD pages of the sequence and the UD page accessed using the MD sequence. The one or more MD pages requested include the MD page that caused the cache miss and also include all MD pages in the sequence subsequent to the MD page that caused the cache miss. The forwarding read command may be issued in the step 910 by the first code to a component. From the step 910, control proceeds to the step 912.

At the step 912, the forwarding read command is received by the component implementing the forwarding read command. As described in more detail elsewhere herein, the component may be a hardware component such as a single PD or a controller in communication with multiple PDs. The component may include embedded code that implements the forwarding read command. The component may also be kernel code that implements the forwarding read command.

From the step 912, control proceeds to the step 914. At the step 914, the component obtains the on-disk copies of the requested one or more MD pages and the UD page from one or more PDs and returns the on-disk copies of the requested pages to the first code. The first code may issue a second forwarding read command, as needed, if any on-disk copy of a MD page returned includes a stale, invalid, or out of date pointer that was used by the forwarding read command processing to access another on-disk copy of a page returned. As discussed in more detail elsewhere herein, an on-disk copy of a MD page may include a stale or invalid pointer if there is also a different version of the MD page content stored in the cache where the cached MD page is WP or dirty. In this case, the cached copy of the MD page is more recent than the on-disk copy that was used to retrieve the remaining subsequent MD pages of the sequence and also retrieve the UD page. In at least one embodiment, it may not be a typical or usual occurrence where a returned on disk-copy of a MD page may include stale or invalid data. However, an embodiment in accordance with the techniques herein may include additional processing to detect such an occurrence and then also issue a second forwarding read command using the more up to date pointer of the cached copy of the MD page. The foregoing is described in more detail elsewhere herein.

From the step 914, control proceeds to the step 916. At the step 916, the first code updates the cache, as needed whereby the first code may store any of the one or more on-disk copies of the pages returned in response to the one or more forwarding read command, as issued in the steps 912 and 914. Generally, in the step 916, the first code may update the cache to include the on-disk versions of the pages returned provided that any such page does not include stale or invalid data (e.g., does not have a more updated version of the page marked as WP or dirty already in the cache).

What will now be described in more detail are examples of various embodiments in accordance with the techniques herein.

Figure 7:
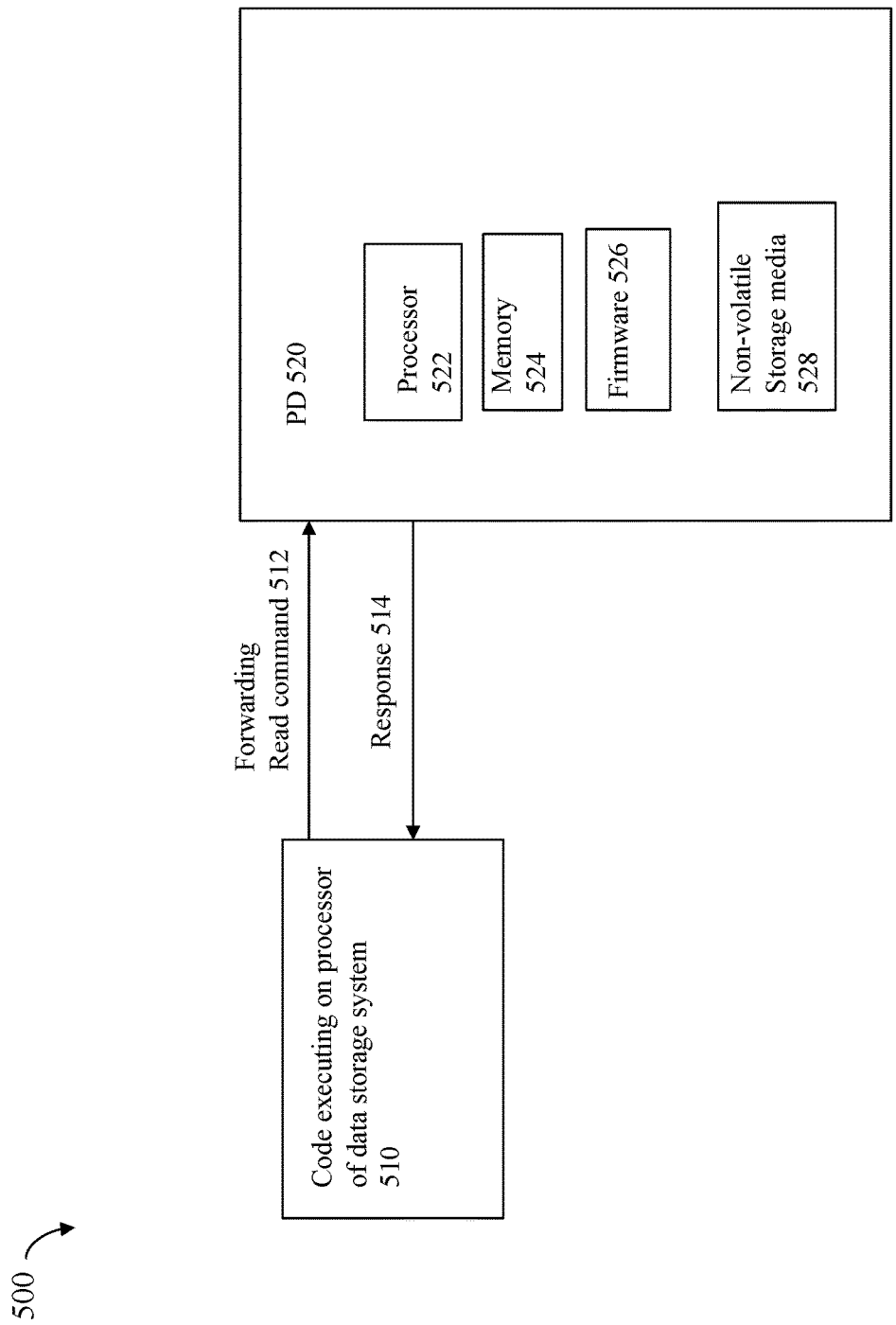
FIGS. 7, 8, 9, and 10 illustrate different embodiments of components that may be used in an embodiment in accordance with the techniques herein.

Referring to FIG. 7, shown is an example 500 of an embodiment in which the component receiving the forwarding read command and implementing (e.g., performing processing to service the forwarding read command) is a single PD. The example 500 includes code 510 corresponding to the first code such as described in connection with FIG. 6. The code 510 may be code executing on a processor of the data storage system that issues a forwarding read command 512 to a component that is PD 520. The PD 520 may be a back-end non-volatile storage device including on-disk copies of MD and UD pages. The PD 520 may include one or more processor 522, memory 524, firmware 526 and non-volatile storage media 528 upon which the pages of MD and UD, as well as other data, may be stored. The memory 524 may be any suitable form such as DRAM or RAM. The firmware 526 may include code stored thereon that is executed by one of the processors 522 of the PD 520 to implement the forwarding read command. Such code of the firmware 526 may perform processing, for example, such as in connection with the step 914 of FIG. 6. In the embodiment of FIG. 7, the code of the firmware implementing the forwarding read command may traverse the sequence of MD pages beginning with a particular MD page of the sequence as specified in connection with parameters of the forwarding read command. For example, parameters of the forwarding read command may include the address within a MD page where the address triggered the MD page cache miss. A parameter may identify a type of the MD page including the address that caused the cache miss. The type of the MD page may identify the particular level of the structure 350 of FIG. 5A as one of a top, mid, leaf, or VLB type of MD page. As a variation, different information may be provided that denotes the particular position in the MD sequence or path of pages traversed such as described in connection with the FIG. 5B. Such parameters may provide context to the invoked code of the firmware 526 implementing the forwarding read command with respect to the on-demand copies of the MD pages and UD page to be retrieved from the PD 520. Such context may be used to identify the number and type of pages expected when continuing traversal of the path or MD sequence from a specified point identified by the parameters.

In the embodiment illustrated in FIG. 7, the PD 520 may be expected to include all the requested pages stored on its non-volatile storage media 528 whereby the PD 520 returns the requested pages in a response 514 to the code 510. In at least one embodiment, in the event that all requested pages are not included in the single PD 520, the PD 520 would not be able to completely service the forwarding read command and may return to the code 510 whatever requested one or more pages are stored on the media 528 of the PD 520. In such a case, the code 510 may perform other processing, such as issue another forwarding read command or a regular read to a different PD configured like the PD 520.

In at least one embodiment, multiple PDs may each be configured like the PD 520 where each such PD may be able to service a forwarding read command with respect to pages of data stored on the single PD that received the forwarding read command. In at least one embodiment, each of the multiple PDs may not be able to directly communicate with another one of the PDs in order to obtain on-disk copies of data stored on another one of the PDs.

Figure 8:
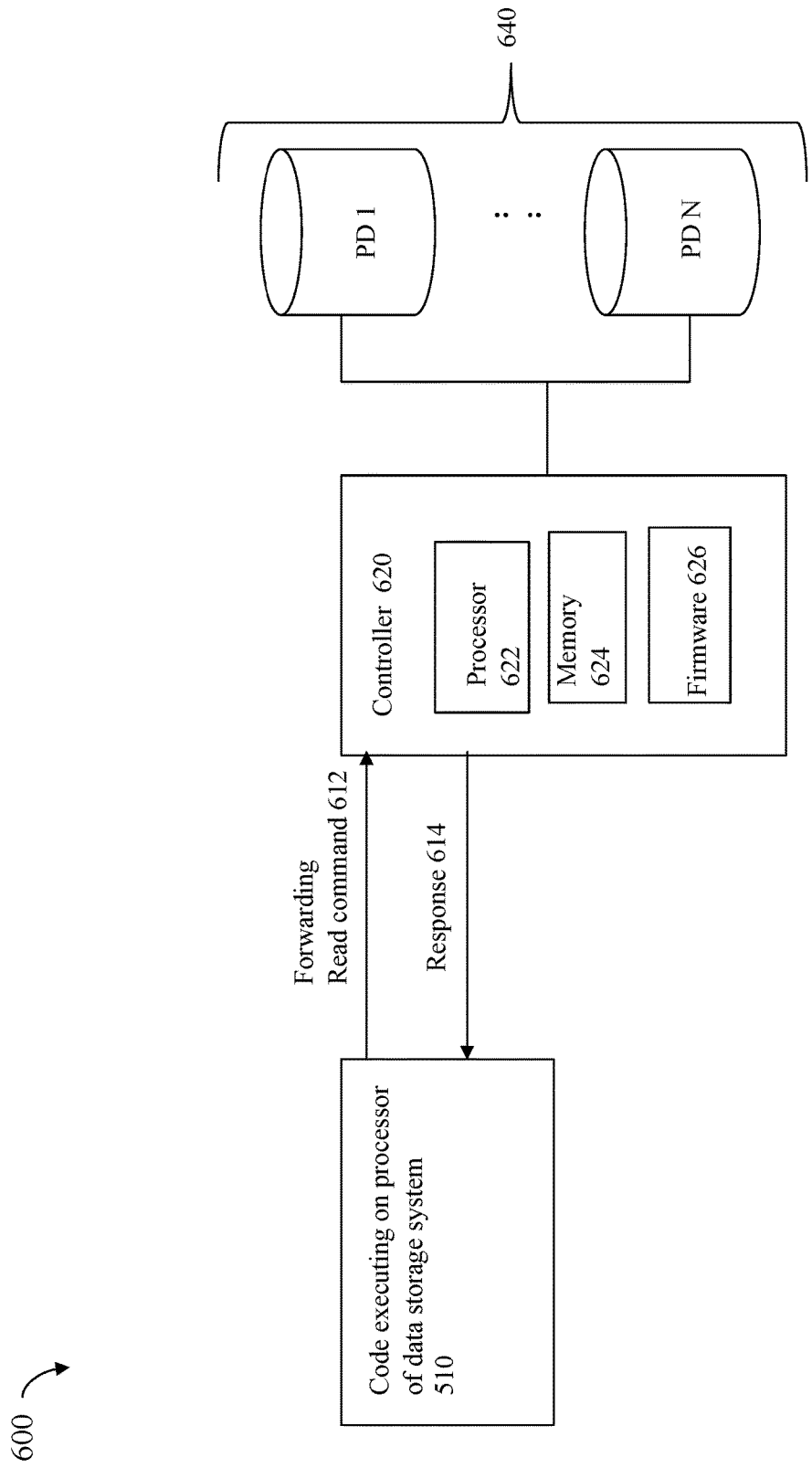

Referring to FIG. 8, shown is an example 600 of an embodiment in which the component receiving the forwarding read command and implementing (e.g., performing processing to service the forwarding read command) is a controller 620 that may communicate with multiple PDs 640. The example 600 includes code 510 such as described in connection with FIG. 7. The code 510 in this example may be code executing on a processor of the data storage system that issues a forwarding read command 612 to a component that is the controller 620. The controller 620 may be connected to and in communication with multiple back-end non-volatile storage devices PDs 640 that include on-disk copies of MD and UD pages. The controller 620 may include one or more processor 622, memory 624 and firmware 626 respectively similar to 522, 526 and 526 of FIG. 7. The PDs 640 may be non-volatile storage devices upon which the pages of MD and UD, as well as other data, may be stored.

In the example 600, the firmware 626 may include code stored thereon that is executed by one of the processors 622 to implement the forwarding read command. Such code of the firmware 626 may perform processing, for example, such as in connection with the step 914 of FIG. 6. In the embodiment of FIG. 8, the code of the firmware implementing the forwarding read command may traverse the sequence of MD pages beginning with a particular MD page of the sequence as specified in connection with parameters of the forwarding read command. In the embodiment illustrated in FIG. 8, the firmware 626 of the controller 620 implementing the forwarding read command may communicate with the PDs 640 to obtain the requested MD and UD pages whereby the controller 620 returns the requested pages in a response 614 to the code 510. In at least one embodiment, in the event that all requested pages cannot be obtained by the controller 620, the controller 620 would not be able to completely service the forwarding read command and may return to the code 510 whatever requested one or more pages are stored on the PDs 640. In such a case, the code 510 may perform other processing, such as issue another forwarding read command or a regular read to a different PD, different controller configured like 620, and the like.

In at least one embodiment, the controller 620 and PDs 640 may be included in the same DAE (disk array enclosure).

Figure 9:
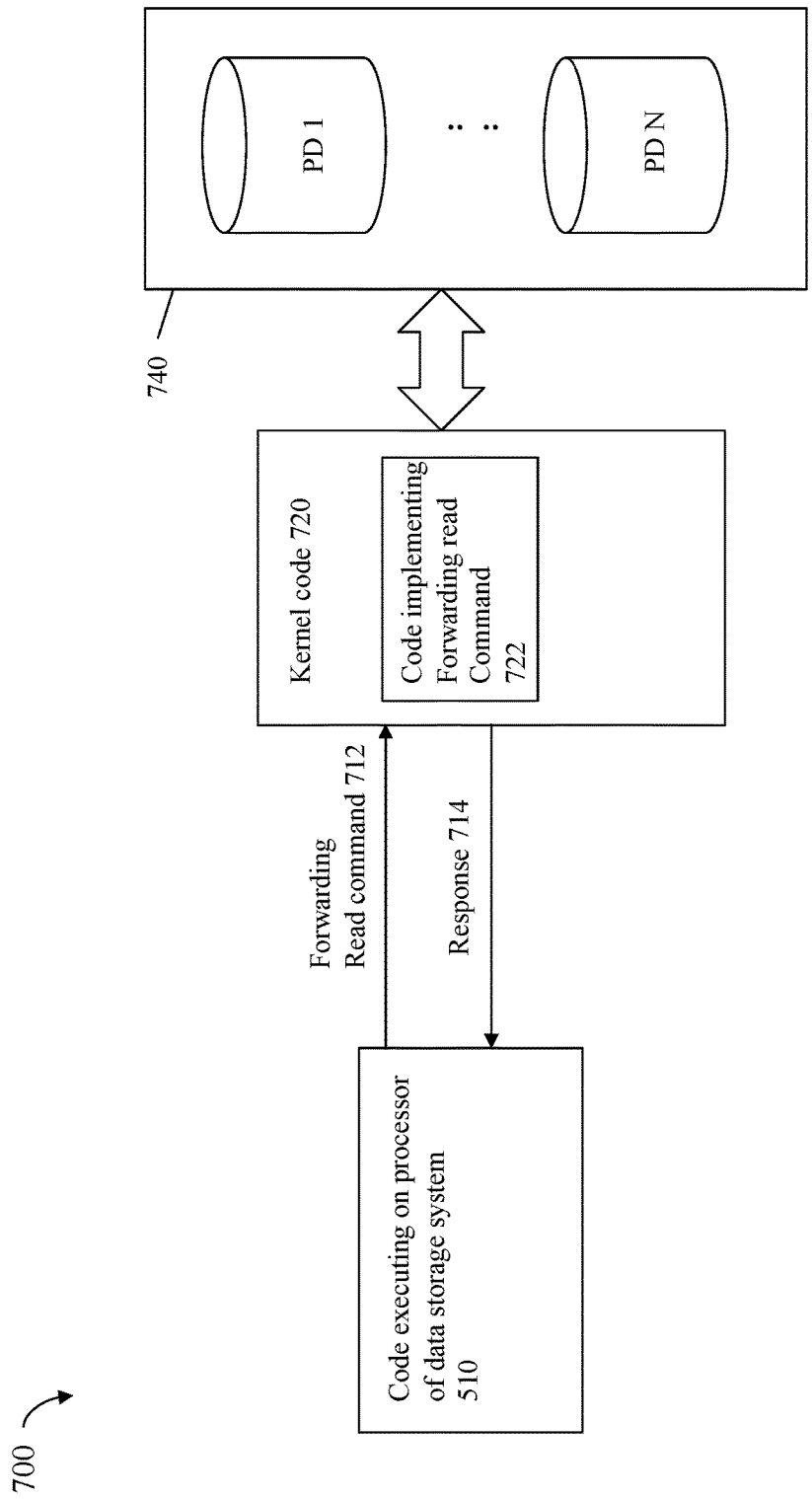

Referring to FIG. 9, shown is an example 700 of an embodiment in which the component receiving the forwarding read command and implementing (e.g., performing processing to service the forwarding read command) is kernel code 720 that may communicate with multiple PDs 740. The example 700 includes code 510 such as described in connection with FIG. 7. The code 510 in this example may be code executing on a processor of the data storage system that issues a forwarding read command 712 to a component that is the kernel code 720. The kernel code 720 may be communicate with multiple back-end non-volatile storage devices PDs 740 that include on-disk copies of MD and UD pages. In at least one embodiment, the kernel code 720 may execute on a processor of the data storage system, (e.g., one of the SPs 27 of FIG. 1). The kernel code 720 includes code 722 that implements the forwarding read command. The PDs 740 may be non-volatile storage devices upon which the pages of MD and UD, as well as other data, may be stored.

In the example 700, the code 722 may perform processing, for example, such as in connection with the step 914 of FIG. 6. In the embodiment of FIG. 9, the code 722 implementing the forwarding read command may traverse the sequence of MD pages beginning with a particular MD page of the sequence as specified in connection with parameters of the forwarding read command. In the embodiment illustrated in FIG. 9, the code 722 implementing the forwarding read command may communicate with the PDs 740 to obtain the requested MD and UD pages whereby the kernel code 720 returns the requested pages in a response 714 to the code 510. In at least one embodiment, in the event that all requested pages cannot be obtained by the kernel code 720 from the PDs 740, the kernel code 720 would not be able to completely service the forwarding read command and may return to the code 510 whatever requested one or more pages are stored on the PDs 740.

Figure 10:
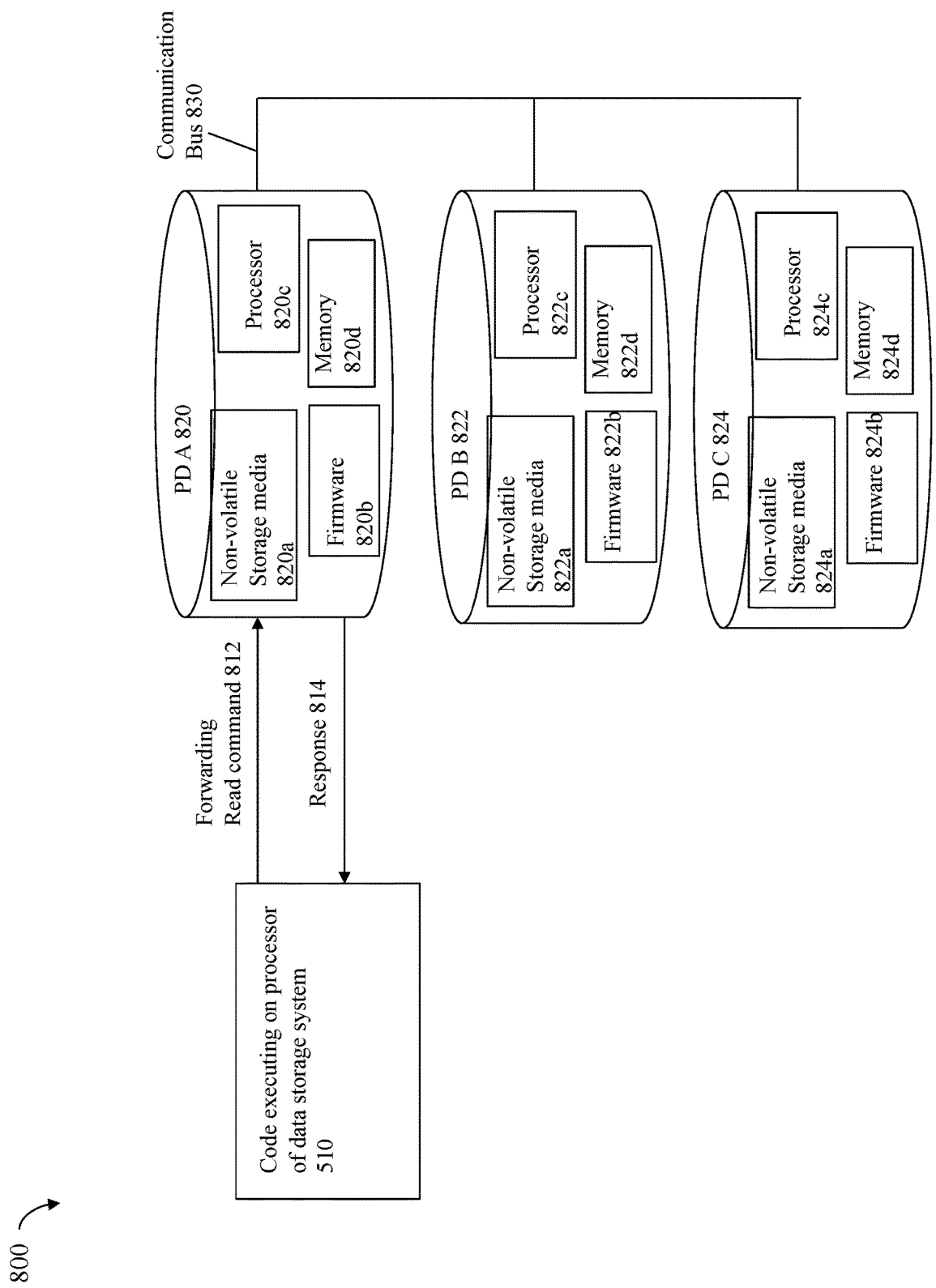

Referring to FIG. 10, shown is an example 800 of an embodiment in which the component receiving the forwarding read command and implementing (e.g., performing processing to service the forwarding read command) is a single PD, such as PD A 820. The example 800 includes code 510 corresponding to the first code such as described in connection with FIG. 6. The code 510 may be code executing on a processor of the data storage system that issues a forwarding read command 812 to a component that is PD A 820. The PD A 820 may be similar to that PD 520 of FIG. 7 with the added difference that the PD A 820 is also configured to communicate with other PDs, such as PDs 822 and 824. Each of the PDs 822 and 824 may be similar to the PD 820. Each of the PDs 820, 822 and 824 may communicate with each directly over the communication bus 830. Thus, each of the PDs 820, 822 and 824 may include additional code that performs such communication with other PDs on the bus 830 in connection with retrieving the requested on-disk copies of the pages for servicing a forwarding read command.

In the embodiment of FIG. 10, the code of the firmware 820b implementing the forwarding read command may traverse the sequence of MD pages beginning with a particular MD page of the sequence as specified in connection with parameters of the forwarding read command.

In the embodiment illustrated in FIG. 7, the PD 520 may be expected to include all the requested pages stored on its non-volatile storage media 528 whereby the PD 520 returns the requested pages in a response 514 to the code 510. In contrast to FIG. 7, in the embodiment of FIG. 10, the requested pages may be located on any one or more of the PDs 820, 822 and 824 in communication with one another over the bus 830. In the event that all requested pages are not included in the single PD 820 receiving the forwarding read command, the PD 820 may issue one or more requests over the bus 830 to the PDs 822 and 824 to obtain any needed on-disk pages. To further illustrate, the forwarding read command 812 issued to PD 820 may include first address of a Mid MD page whereby the code 510 experience a cache miss when attempting to read the content or data stored at the first address. The code implementing the forwarding read command may be executed by processor 820c and may be included in the firmware 820b. Processing may be performed by the PD 820 that reads the Mid MD page including the first address from its own storage media 820a PD 820 then obtains the contents of the first address whereby the contents is a second address in a MD leaf page. The PD 820 determines that the MD leaf page is not located on its media 820a and issues a request over the bus 830 to obtain the MD leaf page from PD 822. Thus, the needed MD leaf page is stored on storage media 822a of PD 822. The addressing scheme used to specify the first address may encode or identify the particular PD including the desired page. Thus, the first address specifies or encodes the particular PD 822 and a location on the PD 822 for the desired MD page leaf. PD 822 returns the MD page leaf over the bus 830 to the PD 820. PD 820 then reads the contents of the first address of the MD page leaf to obtain a second address in a VLB page. The PD 820 determines that the VLB page is stored on its own media 820a whereby the contents of the second address is read from 820a to obtain a third address in a UD page. The PD 820 may determine that the third address is located on a UD page that is stored on PD 824 where the PD 820 issues a second request over the bus 830 to the PD 824. In response to the second request, the PD 824 returns the requested UD page over the bus 830 to the PD 820. The PD 820 now has all the requested on-disk copies of the pages and returns the on-disk copies of the pages to the code 510 in the response 814.

In at least one embodiment, the bus 830 may be a PCIe (Peripheral Component Interconnect Express) bus and the PDs 820, 822 and 824 may be SSDs that directly communicate with one another using the NVM Express® (NVMe™) protocol over the PCIe bus.

What will now be described in connection with flowcharts of FIGS. 11, 12, 13, 14, 15 and 16 are processing steps that may be performed in an embodiment in accordance with the techniques herein. Such flowcharts provide further detail regarding the processing of FIG. 10.

Figure 11:
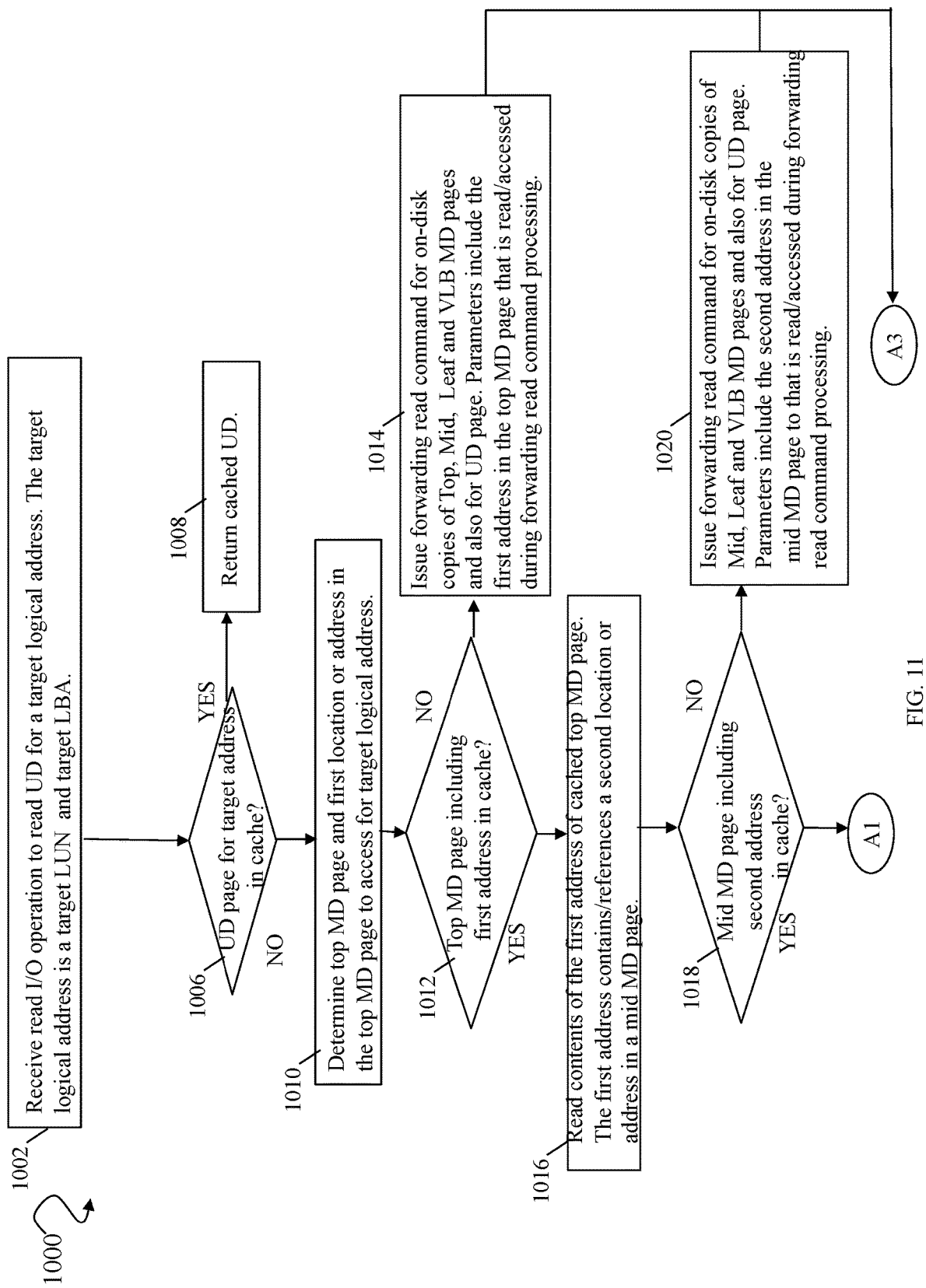
Figure 12:
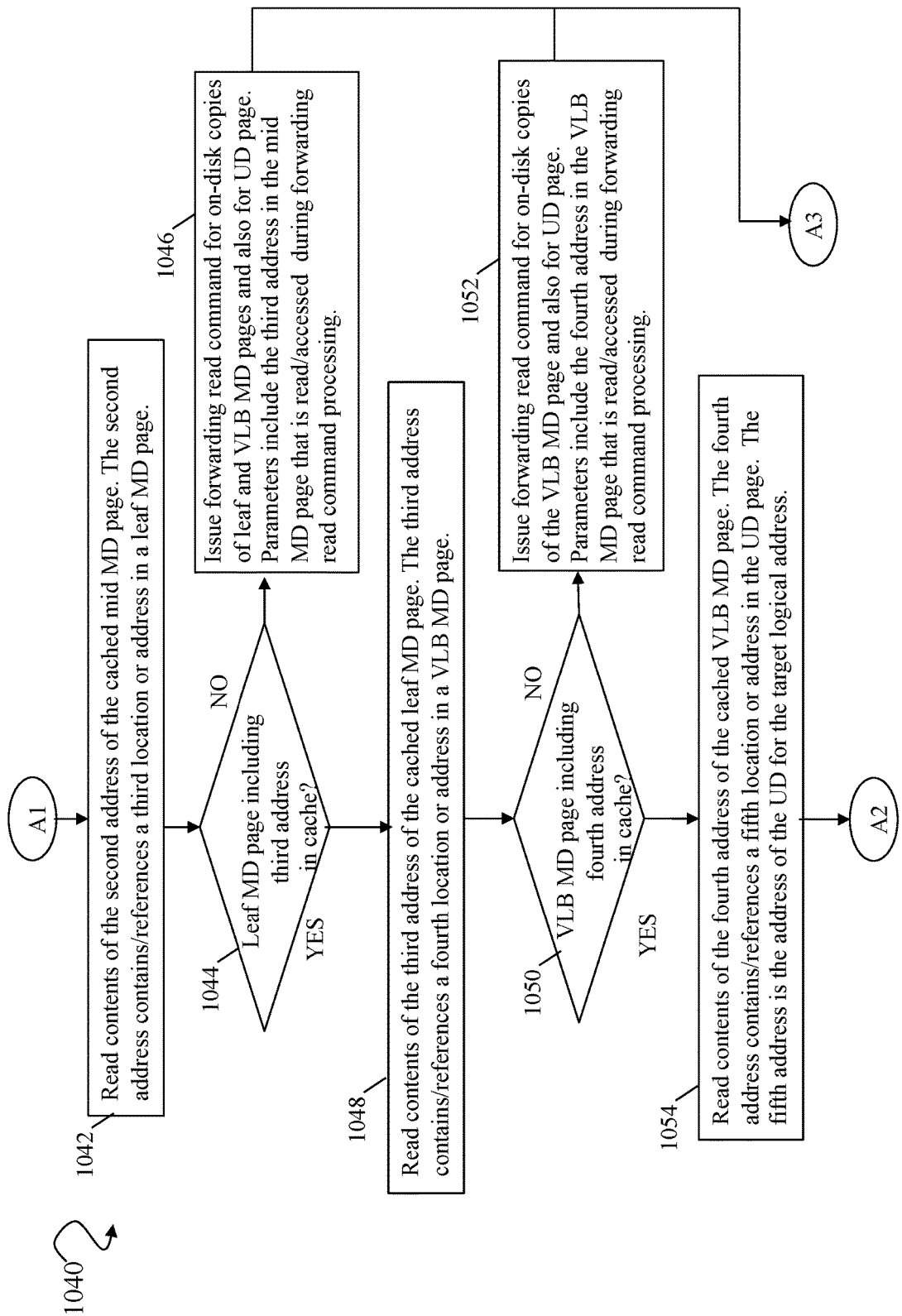
Figure 13:
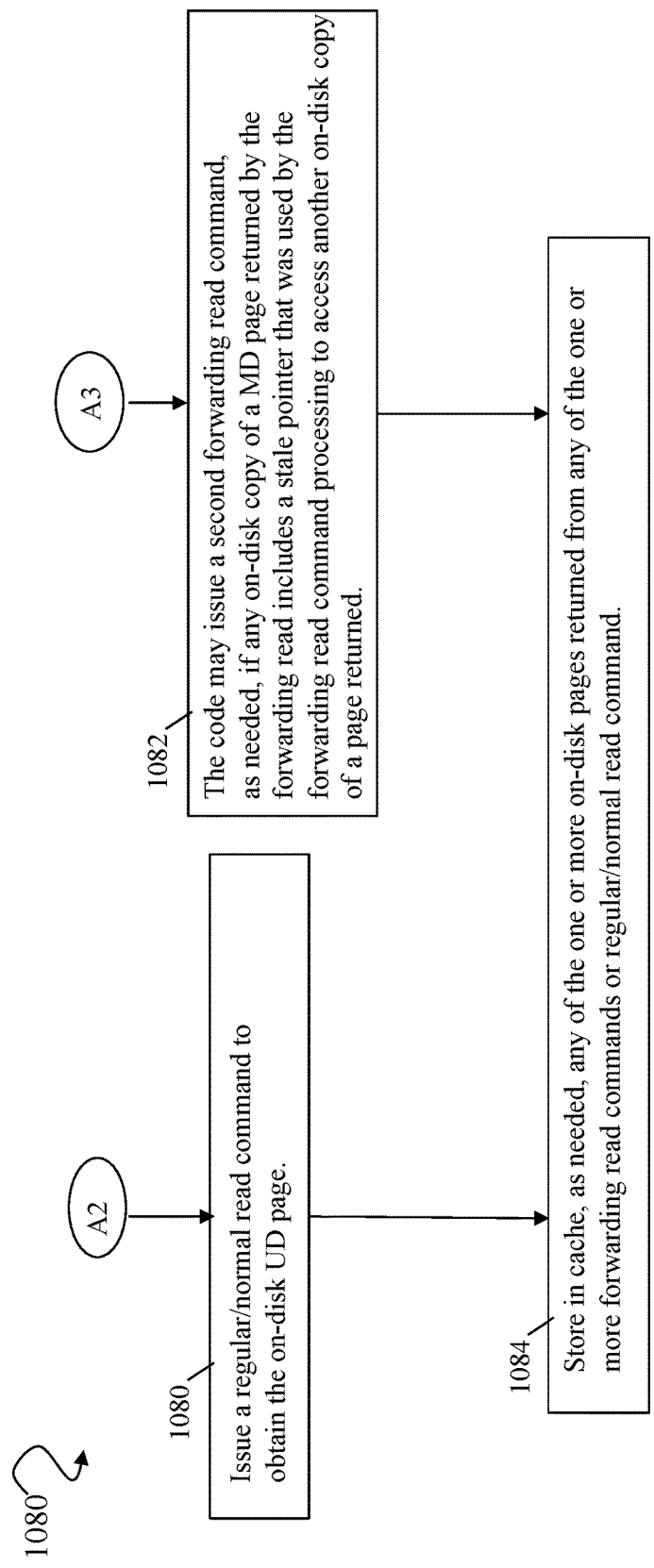

Referring to FIGS. 11, 12 and 13, shown respectively are flowcharts 1000, 1040 and 1080 that may be performed by code, such as the code 510 of FIGS. 7-10, in connection with processing a read I/O operation to obtain requested UD stored at a target logical address. The code 510 may be executed on a processor of the data storage system.

At the step 1002, a read I/O operation may be received by the data storage system to read UD for a target logical address in the form of a target LUN and target LBA. From the step 1002, control proceeds to the step 1006 where a determination is made as to whether the UD page for the target logical address is in cache. Step 1006 may be performed, for example, by querying a page table. Also, subsequent steps 1010, 1012, 1018, 1044 and 1050 described below may also be performed using a page table.

If the step 1006 evaluates to yes, the cached UD is returned in step 1008. If the step 1006 evaluates to no, control proceeds to the step 1010. At the step 1010, processing is performed to determine the particular top MD page and first location or address in the top MD page to be used for the target logical address.

From the step 1010, control proceeds to the step 1012 where a determination is made as to whether the top MD page needed including the first address is in cache. If the step 1012 evaluates to no, control proceeds to the step 1014. At the step 1014, the code issues a forwarding read command for on-disk copies of the top, mid, leaf and VLB MD pages and also for the UD page. The parameters of the command may include the first address in the top MD page that is read/accessed during the forwarding read command processing. From the step 1014, control proceeds to the step 1082.

If the step 1012 evaluates to yes, control proceeds to the step 1016. At the step 1016, the contents of the first address is read from the cached copy of the top MD page. The first address contains an address of, or references, a second location or address in a mid MD page. From the step 1016, control proceeds to the step 1018 where a determination is made as to whether the mid MD page including the second address is stored in cache. If the step 1018 evaluates to no, control proceeds to the step 1020. At the step 1020, a forwarding read command is issued for on-disk copies of the mid, leaf and VLB MD pages and also for the UD page. The parameters of the command may include the second address in the mid MD page that is read/accessed during the forwarding read command processing. From the step 1020, control proceeds to the step 1082.

If the step 1018 evaluates to yes, control proceeds to the step 1042. At the step 1042, processing is performed to read the contents of the second address of the cache mid MD page. The second address contains a third address that is an address of, or references, a third location or address in a leaf MD page. From the step 1042, control proceeds to the step 1044 where a determination is made as to whether the lead MD page including the third address is in cache. If the step 1042 evaluates to no, control proceeds to the step 1046. At the step 1046, a forwarding read command is issued for on-disk copies of the leaf and VLB MD pages and also for the UD page. The parameters of the command may include the third address in the leaf MD page that is read/accessed during the forwarding read command processing. From the step 1046, control proceeds to the step 1082.

If the step 1044 evaluates to yes, control proceeds to the step 1048 to read the contents of the third address of the cached leaf MD page. The third address contains a pointer to (e.g., address of) a fourth location or address in a VLB MD page. From the step 1048, control proceeds to the step 1050 where a determination is made as to whether the VLB MD page including the fourth address is in cache. If the step 1050 evaluates to no, control proceeds to the step 1052 where a forwarding read command is issued for on-disk copies of the VLB MD page and also for the UD page. The parameters of the command may include the fourth address in the VLB MD page that is read/accessed during the forwarding read command processing. From the step 1052, control proceeds to the step 1082.

If the step 1050 evaluates to yes, control proceeds to the step 1054 to read the contents of the fourth address of the cached LBD MD page. The fourth address contains or references a fifth location or address in the UD page. The fifth address is the address of the UD for the target logical device. From the step 1054, control proceeds to the step 1080 where processing may be performed to issue a regular or normal read command to obtain the on-disk UD page. From the step 1080 control proceeds to the step 1084.

At the step 1082 (e.g., transferred to from steps 1046, 1052, 1014 and 1020), a second forwarding read command may be issued, as needed, if any on-disk copy of a MD page returned by the forwarding read includes a stale, outdated or invalid pointer that was used by the forwarding read command processing to access another on-disk copy of a page returned. From the step 1082, control proceeds to the step 1084.

At the step 1084, processing is performed to update or store in cache, as needed, any of the one or more on-disk pages returned from any of the one or more forwarding read commands or regular read command. The step 1084 is similar, for example, to the step 916 of FIG. 6 as discussed elsewhere herein.

Figure 14:
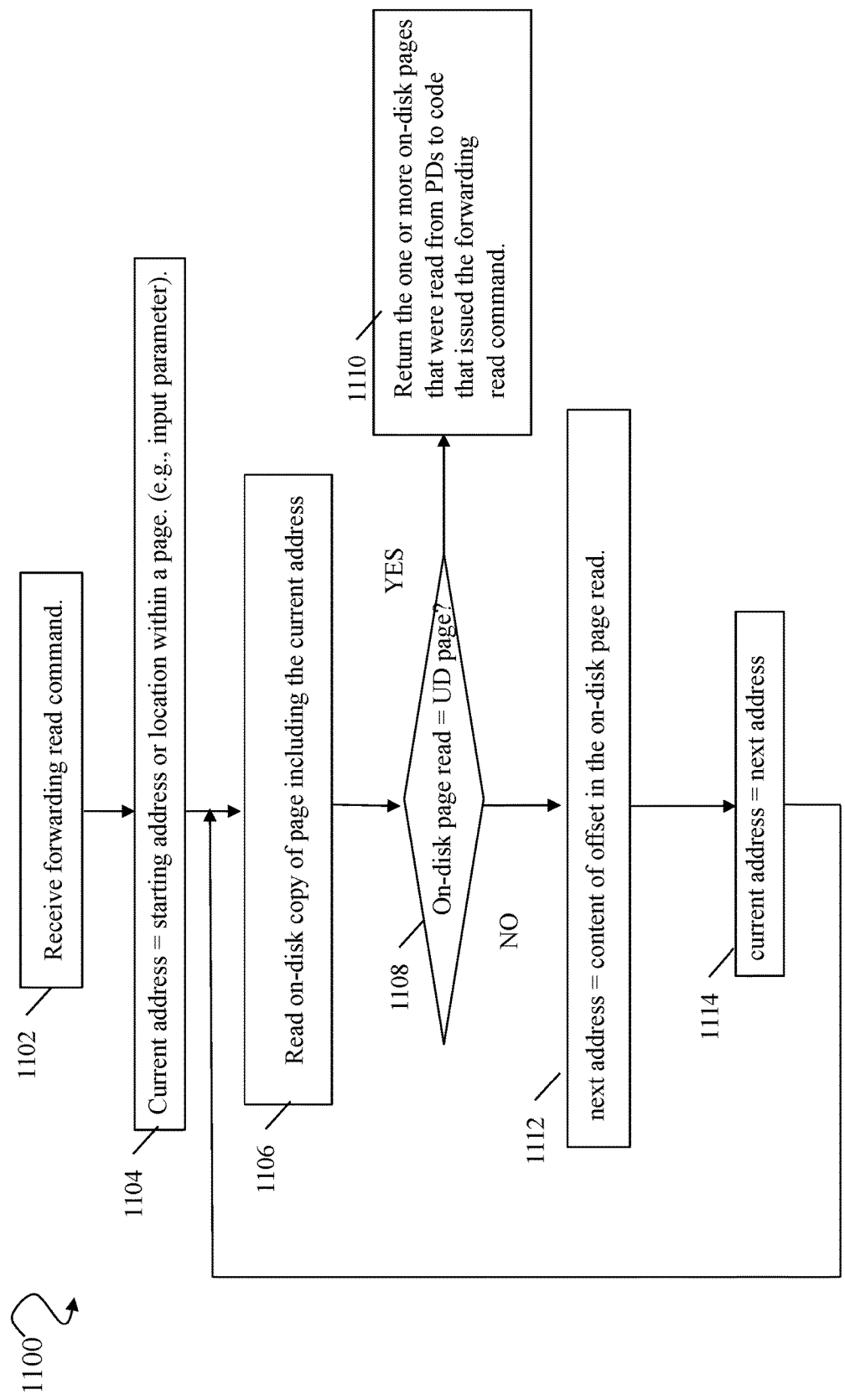

Referring to FIG. 14, shown is a flowchart of processing that may be performed by code, such as component, that implements or services a received forwarding read command. At the step 1102, the component receives the forwarding read command. From the step 1102, control proceeds to the step 1104. At the step 1104, current address is assigned the starting address or location within a page. The current address is initialized in the step 1104 to the address within the initial MD page of the sequence for which the component commences traversal of subsequent pages. In at least one embodiment, the current address may be the address provided as an input parameters of the forwarding read command.

From the step 1104, control proceeds to the step 1106 where the component obtains or reads the on-disk copy of the page including the current address. From the step 1106, control proceeds to the step 1108. At the step 1108, a determination is made as to whether the on-disk page read is a UD page. If so, control proceeds to the step 1110 where processing is performed to return the requested copies of the on-disk pages read from one or more PDs. The on-disk pages are returned to the code that issued the forwarding read command. If the step 1108 evaluates to no, control proceeds to the step 1112 where next address is assigned the content of an offset or location in the on-disk page just read. Consistent with discussion herein, the offset or location in the page may be determined based on the target logical address. For example, the offset or location to be accessed within each page may be determined using the LBA within the LUN of the target logical address (e.g., mapping between the target logical address and an entry, offset or location in the current on-disk page just read). From the step 1112, control proceeds to the step 1114 to assign next address to current address. From the step 1114, control proceeds to the step 1106 to obtain the on-disk copy of the next page including the current address.

Figure 15:
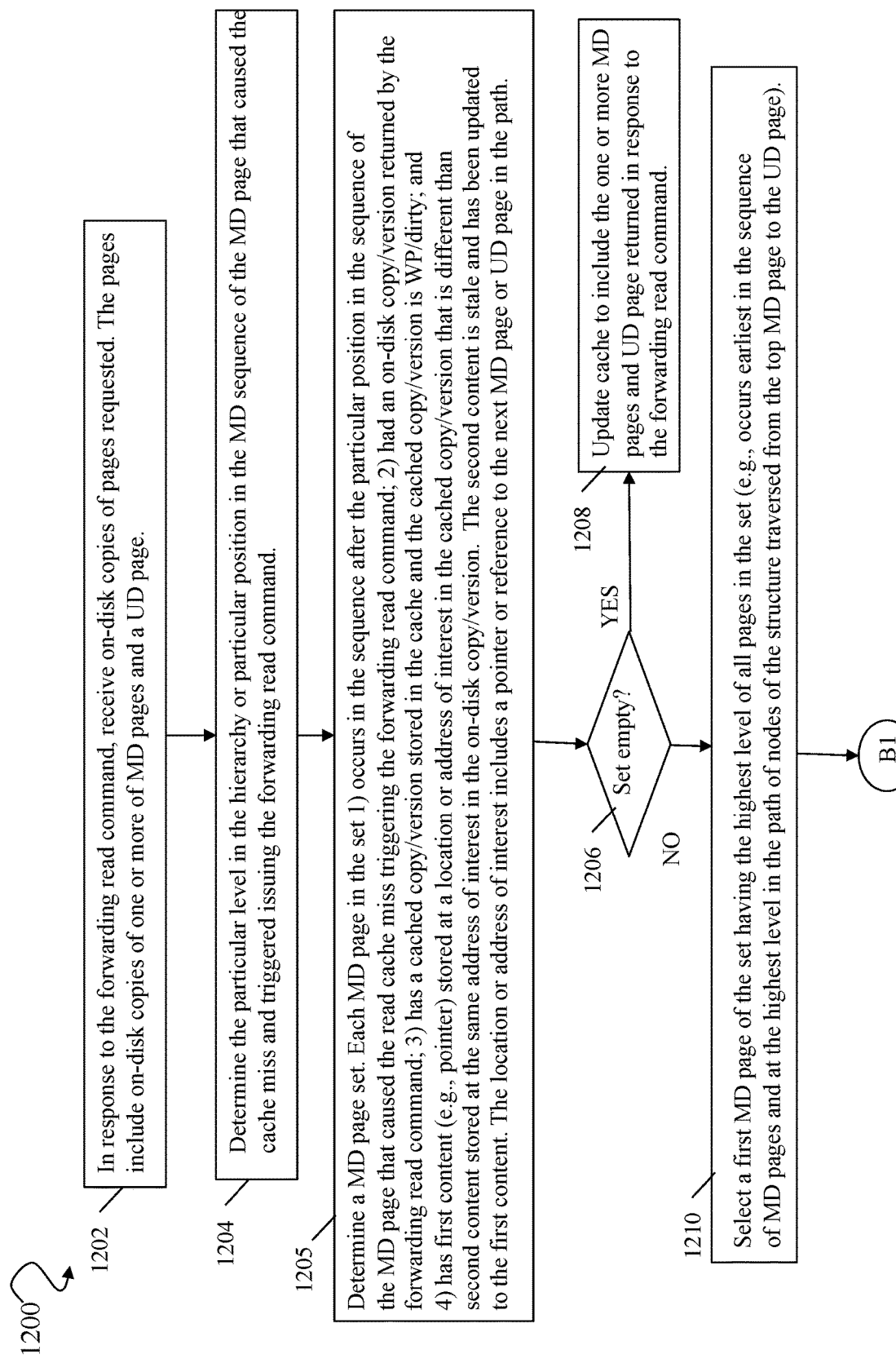
Figure 16:
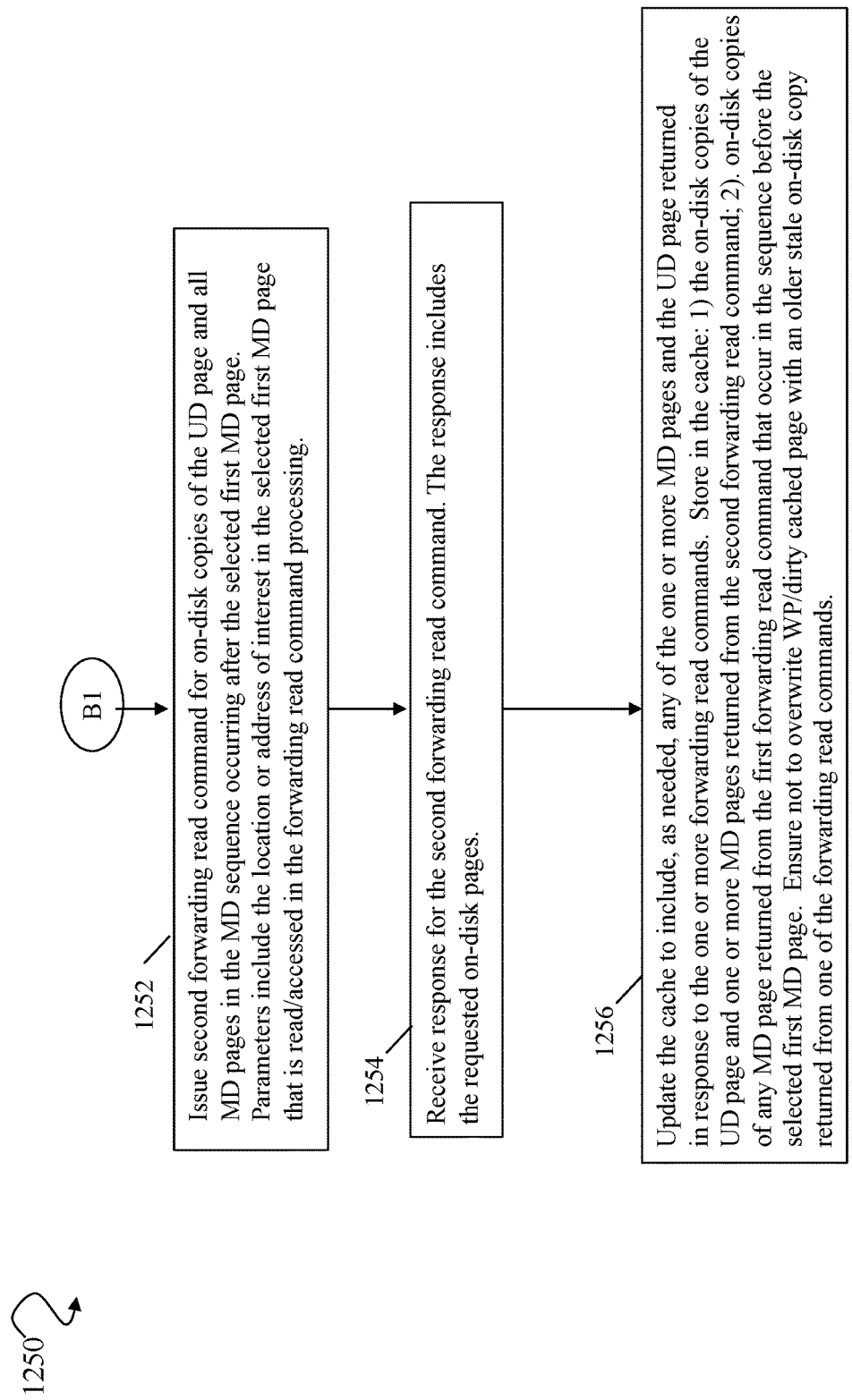

Referring to FIGS. 15 and 16, shown are respectively flowcharts 1200 and 1250 of processing steps that may be performed by code that issues a forwarding read once the code receives the response to the forwarding read command previously issued to the component. The steps of FIGS. 15 and 16 may be performed, for example, by the code 510 of FIGS. 7-10. The steps of FIGS. 15 and 16 may be performed, for example, when the code 510 receives the response to a forwarding read command previously issued, such as in steps 1014, 1020, 1046 and 1052.

At the step 1202, a response to a previously issued forwarding read command may be received. The response includes the on-disk copies of the pages requested. The pages may include on-disk copies of one or more MD pages and a UD page. From the step 1202, control proceeds to the step 1204. At the step 1204, processing determines the particular level in the structure or hierarchy (e.g., 350 of FIG. 5A) or the particular position in the sequence of the MD pages that caused the cache miss ad triggered issuance of the forwarding read command. From the step 1204, control proceeds to the step 1205 to determine a MD page set. Each MD page in the set 1) occurs in the sequence after the particular position in the sequence of the MD page that caused the read cache miss triggering the prior forwarding read command; 2) had an on-disk copy or version returned (in step 1202) by the forwarding read command; 3) has a cached copy or version stored in the cache and the cached copy or version is WP or dirty; and 4) has first content (e.g., pointer) stored at a location or address of interest in the cached copy or version that is different than second content stored at the same address of interest in the on-disk copy or version. The second content is stale or invalid and has been updated to the first content. The location or address of interest includes a pointer or reference to the next MD page or UD page in the path. The foregoing 4 attributes or characteristics may also be referred to as criteria used to determine MD pages of the MD page set.

From the step 1205, control proceeds to the step 1206 where a determination is made as to whether the MD page set determined in step 1205 is empty. If the step 1206 evaluates to yes, control proceeds to the step 1208 to update the cache to include the one or more MD pages and UD page returned in response to the forwarding read command. If the step 1206 evaluates to no, control proceeds to the step 1210. At the step 1210, processing is performed to select a first MD page of the MD page set having the highest level in the structure, such as 350 of FIG. 5A, of al pages in the set. In other words, the first MD page selected with respect to all/any other MD pages of the set occurs earliest in the sequence of MD pages traversed and at the highest level in the path of nodes of the structure 350. It should be noted that the top or root MD page 302 is the highest level of the structure and the UD pages are at the lowest level in the structure. Thus, the VLB MD pages in the FIG. 5A are the lowest level MD pages in the hierarchy 350.

From the step 1210, control proceeds to the step 1252. At the step 1252, a second forwarding read command is issued for on-disk copies of the UD page and all MD pages in the MD sequence occurring after the selected first MD page (e.g., selected in the step 1210). The parameters of the second forwarding read command includes the location or address of interest in the selected first MD page. From the step 1252, control proceeds to the step 1254 where a response to the second forwarding read command is received that includes on-disk copies of the requested pages. From the step 1254, control proceeds to the step 1256. At the step 1256, processing is performed to update the cache, as needed, any of the one or more MD pages and the UD page returned in response to the one or more forwarding read commands. The step 1256 may include storing in the cache 1) the on-disk copies of the UD page and the one or more MD pages returned from the second forwarding read command; and 2) on-disk copies of the any MD page returned from the first forwarding read command that occur in the sequence before the selected first MD page. Processing of the step 1256 may ensure not to overwrite any WP or dirty cached page with an older stale or invalid on-disk copy returned from one of the forwarding read commands.

To more fully illustrate the generalized processing of FIGS. 15 and 16, consider an illustrative example as described in following paragraphs. Assume that code executing on a processor of the data storage system performs processing as described above to read UD stored at a target logical address. A cache miss may occur in connection with reading the UD whereby a traversal of MD pages is performed such as described, for example, in FIGS. 11 and 12. During this traversal of MD pages, processing determines that the MD page top containing a first address needed is in the cache but that the mid MD page pointed to by first address of the MD page top is not in cache. Thus, a cache miss occurs with respect to a second address stored as content of the first address in the MD page top. The second address is a pointer to a MD page mid. A first forwarding read command is issued, for example, such as in the step 1020 of FIG. 11. In response to the first forwarding read command, on-disk copies of mid, leaf and VLB MD pages are returned along with an on-disk copy of a UD page. Examination of the cache determines that top and mid MD pages needed were not in cache. However, the cache does include cached copies of the lower level leaf and VLB MD pages corresponding to those returned in response to the first forwarding read command. In other words, the first forwarding read command returned a first version or copy of the VLB and leaf MD pages and the UD page as stored on-disk and the cache includes a second different version or copy of the same VLB and leaf MD pages. The cached copies of the VLB and leaf MD pages are all denoted as WP or dirty indicating that the on-disk copies returned by the response to the first forwarding read command are stale, invalid or out of date. Rather the cached copies of the VLB and leaf MD pages are the most recent or up to date. In this case, the component that implemented or serviced the first forwarding read used the stale, invalid pointers of the VLB and leaf MD pages. In particular, first contents stored at a third address of interest in the on-disk copy of the leaf MD page (returned by the first forwarding read command) is different than second contents stored at the third address of interest in the cached copy of the leaf MD page. The second contents stored at the third address of interest in the cached copy of the leaf MD page denotes the correct pointer to the correct VLB MD page. However, in servicing the first forwarding read, the component used the first contents of the on-disk copy which is an invalid or incorrect pointer. Thus, a second forwarding read command is now issued to obtain the correct on-disk copies of the VLB MD page and UD page. The second forwarding read command uses the second contents noted above as the pointer to the correct VLB MD page. In response to the second forwarding read command, an on-disk copy of a second VLB MD page and a version of the UD page are returned. In this case, the cache may be updated to include: 1) the on-disk copy of the mid MD page as returned from the first forwarding read command; and 2) the on-disk copies of the VLB MD page and UD page as returned from the second forwarding read command. However, the leaf MD as stored in the cache is already the most up to date copy and is not overwritten with the on-disk copy of the leaf MD as returned in response to the first forwarding read command.

The foregoing description makes reference to a forwarding read command or more generally use of the techniques herein with a read I/O operation or command. More generally, the techniques herein may be used in connection with any I/O command or operation that accesses data. For example, the techniques herein may be used in connection with a write I/O operation or command. In such an embodiment using the techniques herein with a write I/O operation or command that writes to a target logical address of a target LUN and target LBA, the write data is received, stored in the cache and marked as write pending. At a later point in time, the write pending cached data is destaged and written out to the backend PDs. In connection with such destaging, the processing as described herein for a forwarding read may be issued as needed if all required MD pages (e.g., pages in the path from the MD root up to and including the VLB) needed to access the target logical address where the write data is stored are not in the cache. Once the required MD pages are in the cache, processing may be performed to use such MD pages needed to store the new write data to its on-disk location (e.g., store the write data in the data block containing the content of the target logical address). It should be noted that any of the MD pages, including the VLB page, may also be updated as may be needed. In such a case where any of the MD pages are updated, then the updated MD pages may then also be stored to their appropriate on-disk location. In at least one embodiment, the forwarding read request issued may request return only of the MD pages and not the UD page since this is a write operation.

Figure 17:
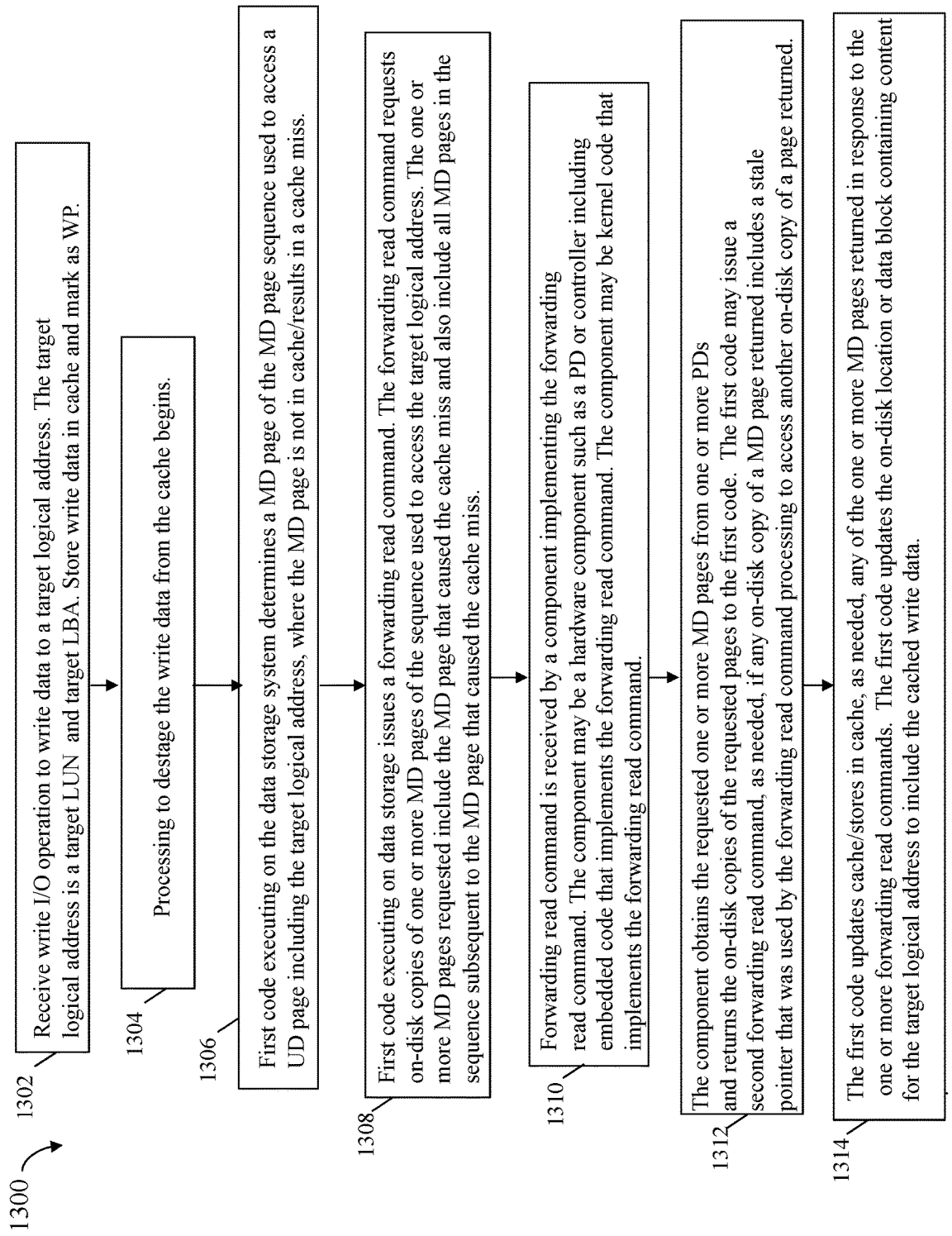

Referring to FIG. 17, shown is a flowchart of processing steps that may be performed in an embodiment in accordance with the techniques herein for a write I/O operation. The flowchart 1300 includes processing described at a level similar to that of FIG. 6 for a read I/O operation.

At the step 1302, a write I/O operation is received at the data storage system to write data to a target logical address. The target logical address is a target LUN and target LBA. The write data is stored in the cache and marked as WP. At a later point in time, processing proceeds from the step 1302 to the step 1304 where processing to destage the write data from the cache begins. Steps of the flowchart 1300 subsequent to the step 1304 may be performed as part of processing to destage the write data from the cache.

From the step 1304, control proceeds to the step 1306. At the step 1306, first code executing on the data storage system determines a MD page of the MD page sequence used to access a UD page including the target logical address, where the MD page is not in cache/results in a cache miss. From the step 1306, control proceeds to the step 1308. At the step 1308, the first code executing on data storage issues a forwarding read command. The forwarding read command requests on-disk copies of one or more MD pages of the sequence used to access the target logical address. The one or more MD pages requested include the MD page that caused the cache miss and also include all MD pages in the sequence subsequent to the MD page that caused the cache miss.

From the step 1308, control proceeds to the step 1310. In the step 1310, the forwarding read command is received by a component implementing the forwarding read command. The component may be a hardware component such as a PD or controller including embedded code that implements the forwarding read command. The component may be kernel code that implements the forwarding read command. From the step 1310, control proceeds to the step 1312. At the step 1312, the component obtains the requested one or more MD pages from one or more PDs and returns the on-disk copies of the requested pages to the first code. The first code may issue a second forwarding read command, as needed, if any on-disk copy of a MD page returned includes a stale pointer that was used by the forwarding read command processing to access another on-disk copy of a page returned. From the step 1312, control proceeds to the step 1314. In the step 1314, the first code updates cache/stores in cache, as needed, any of the one or more MD pages returned in response to the one or more forwarding read commands. The first code updates the on-disk location or data block containing content for the target logical address to include the cached write data.

It is straight forward to further modify as needed and use the techniques herein in connection with processing as described above in connection with a write operation.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing I/O operations comprising:
receiving a read I/O operation that reads first data stored at a target location, wherein a plurality of metadata (MD) pages are accessed and read in a consecutive order to access the target location in a user data (UD) page including the first data;
performing first processing by first code, the first processing including:
determining that a first MD page of the plurality of MD pages is not in cache;
responsive to determining the first MD page is not in the cache, issuing a forwarding read command to a component to obtain the UD page and obtain the first MD page and one or more other MD pages of the plurality of MD pages that are subsequent to the first MD page in the consecutive order; and
receiving, by the first code from the component, a response to the forwarding read command, wherein the response includes the UD page, the first MD page, and the one or more other MD pages subsequent to the first MD page in the consecutive order;
determining whether any page of MD or UD returned in the response to the forwarding read command includes invalid data; and
responsive to determining that no page of MD or UD returned in the response to the forwarding read command includes invalid data, updating the cache to include the UD page, the first MD page and the any one or more other MD pages subsequent to the first MD page in the consecutive order.

2. The method of claim 1, wherein the plurality of MD pages are included in a linked list of MD pages, and wherein the linked list of MD pages includes the plurality of MD pages arranged in an ordering in accordance with the consecutive order.

3. The method of claim 2, wherein a last of the plurality of MD pages in the linked list references the target location in the UD page.

4. The method of claim 1, wherein the component includes second code stored in a memory, wherein the second code, when executed, performs second processing that services the forwarding read command.

5. The method of claim 4, wherein the component is a physical storage device that includes the second code and the second processing performed by the component further comprises:
reading the UD page, the first MD page, and the one or more other MD pages from storage media of the first physical storage device; and
returning the UD page, the first MD page and the one or more other MD pages to the first code.

6. The method of claim 5, wherein the second code is embedded on the physical storage device.

7. The method of claim 4, wherein the component is a controller that communicates with a plurality of physical storage devices, and wherein the controller includes the second code and the second processing performed by the component further comprises:
reading the UD page, the first MD page, and the one or more other MD pages from one or more of the plurality of physical devices; and
returning the UD page, the first MD page and the one or more other MD pages to the first code.

8. The method of claim 4, wherein the component is kernel code that communicates with a plurality of physical storage devices, and wherein the kernel code includes the second code and the second processing performed by the component further comprises:
reading the UD page, the first MD page, and the one or more other MD pages from one or more of the plurality of physical storage devices; and
returning the UD page, the first MD page and the one or more other MD pages to the first code.

9. The method of claim 8, wherein the kernel code and the first code are executed by one or more processors of a data storage system, and wherein the kernel code executes at a higher priority than the first code.

10. The method of claim 4, wherein a plurality of physical storage devices includes a first physical storage device and one or more other physical storage devices, wherein the component is the first physical storage device that communicates with the one or more other physical storage devices, and wherein the first physical storage device includes the second code and the second processing performed by the component further comprises:
reading the UD page, the first MD page, and the one or more other MD pages from one or more of the plurality of physical storage devices; and
returning the UD page, the first MD page and the one or more other MD pages to the first code.

11. The method of claim 10 wherein the first physical storage device communicates directly with the one or more other physical storage devices over a communications bus.

12. A method of processing I/O operations comprising:
receiving a read I/O operation that reads first data stored at a target location, wherein a plurality of metadata (MD) pages are accessed and read in a consecutive order to access the target location in a user data (UD) page including the first data;
performing first processing by first code, the first processing including:
determining that a first MD page of the plurality of MD pages is not in cache;
responsive to determining the first MD page is not in the cache, issuing a forwarding read command to a component to obtain the UD page and obtain the first MD page and one or more other MD pages of the plurality of MD pages that are subsequent to the first MD page in the consecutive order; and
receiving, by the first code from the component, a response to the forwarding read command, wherein the response includes the UD page, the first MD page, and the one or more other MD pages subsequent to the first MD page in the consecutive order;
determining, by the first code, whether one MD page returned in the response to the forwarding read command includes invalid data, wherein the one MD page included in the response is a first version of the one MD page and a second version of the one MD page is stored in the cache, wherein the second version stored in the cache is a more recent version than the first version, wherein the second version includes second content stored at an address of interest in the one MD page stored in the cache and the first version includes first content stored at the address of interest, wherein the first content and the second content are different, and wherein the component uses the first content rather than the second content as a pointer to identify another MD page when performing processing to service the forwarding read command;

responsive to determining that the one MD page of the response includes invalid data issuing, by the first code, a second forwarding read command to the component to obtain one or more pages including a MD page pointed to or reference by the second content; and receiving, from the component, a second response to the second forwarding read command, wherein the second response includes a returned MD page pointed to or referenced by the second content.

13. The method of claim 12, further comprising:
updating the cache to include at least some pages returned in the first response and the second response.

14. The method of claim 13, wherein said updating comprising:
storing the first MD page and the UD page of the response and the returned MD page of the second response in the cache.

15. A system comprising:
one or more processors; and
a memory comprising code stored thereon that, when executed, performs method of processing I/O operations comprising:
receiving a read I/O operation that reads first data stored at a target location, wherein a plurality of metadata (MD) pages are accessed and read in a consecutive order to access the target location in a user data (UD) page including the first data;
performing first processing by first code, the first processing including:
determining that a first MD page of the plurality of MD pages is not in cache;
responsive to determining the first MD page is not in the cache, issuing a forwarding read command to a component to obtain the UD page and obtain the first MD page and one or more other MD pages of the plurality of MD pages that are subsequent to the first MD page in the consecutive order; and
receiving, by the first code from the component, a response to the forwarding read command, wherein the response includes the UD page, the first MD page, and the one or more other MD pages subsequent to the first MD page in the consecutive order;
determining whether any page of MD or UD returned in the response to the forwarding read command includes invalid data; and
responsive to determining that no page of MD or UD returned in the response to the forwarding read command includes invalid data, updating the cache to include the UD page, the first MD page and the any one or more other MD pages subsequent to the first MD page in the consecutive order.

16. A non-transitory computer readable medium comprising code stored thereon that, when executed, performs a method of processing I/O operations comprising:
receiving a read I/O operation that reads first data stored at a target location, wherein a plurality of metadata (MD) pages are accessed and read in a consecutive order to access the target location in a user data (UD) page including the first data;
performing first processing by first code, the first processing including:

determining that a first MD page of the plurality of MD pages is not in cache;
responsive to determining the first MD page is not in the cache, issuing a forwarding read command to a component to obtain the UD page and obtain the first MD page and one or more other MD pages of the plurality of MD pages that are subsequent to the first MD page in the consecutive order; and
receiving, by the first code from the component, a response to the forwarding read command, wherein the response includes the UD page, the first MD page, and the one or more other MD pages subsequent to the first MD page in the consecutive order;
determining whether any page of MD or UD returned in the response to the forwarding read command includes invalid data; and
responsive to determining that no page of MD or UD returned in the response to the forwarding read command includes invalid data, updating the cache to include the UD page, the first MD page and the any one or more other MD pages subsequent to the first MD page in the consecutive order.

17. The non-transitory computer readable medium of claim 16, wherein the plurality of MD pages are included in a linked list of MD pages, and wherein the linked list of MD pages includes the plurality of MD pages arranged in an ordering in accordance with the consecutive order.

18. The non-transitory computer readable medium of claim 17, wherein a last of the plurality of MD pages in the linked list references the target address in the UD page.

19. The non-transitory computer readable medium of claim 16, wherein the component includes second code stored in a memory, wherein the second code, when executed, performs second processing that services the forwarding read command.

20. A system comprising:
one or more processors; and
a memory comprising code stored thereon that, when executed, performs a method of processing I/O operations comprising:
receiving a read I/O operation that reads first data stored at a target location, wherein a plurality of metadata (MD) pages are accessed and read in a consecutive order to access the target location in a user data (UD) page including the first data;
performing first processing by first code, the first processing including:
determining that a first MD page of the plurality of MD pages is not in cache;
responsive to determining the first MD page is not in the cache, issuing a forwarding read command to a component to obtain the UD page and obtain the first MD page and one or more other MD pages of the plurality of MD pages that are subsequent to the first MD page in the consecutive order; and
receiving, by the first code from the component, a response to the forwarding read command, wherein the response includes the UD page, the first MD page, and the one or more other MD pages subsequent to the first MD page in the consecutive order;
determining, by the first code, whether one MD page returned in the response to the forwarding read command includes invalid data, wherein the one MD page included in the response is a first version of the one MD page and a second version of the one MD page is stored in the cache, wherein the second version stored in the cache is a more recent version than the first version, wherein the second version includes second content stored at an address of interest in the one MD page stored in the cache and the first version includes first content stored at the address of interest, wherein the first content and the second content are different, and wherein the component uses the first content rather than the second content as a pointer to identify another MD page when performing processing to service the forwarding read command;

responsive to determining that the one MD page of the response includes invalid data issuing, by the first code, a second forwarding read command to the component to obtain one or more pages including a MD page pointed to or reference by the second content; and receiving, from the component, a second response to the second forwarding read command, wherein the second response includes a returned MD page pointed to or referenced by the second content.

21. A non-transitory computer readable memory comprising code stored thereon that, when executed, performs a method of processing I/O operations comprising:

receiving a read I/O operation that reads first data stored at a target location, wherein a plurality of metadata (MD) pages are accessed and read in a consecutive order to access the target location in a user data (UD) page including the first data;

performing first processing by first code, the first processing including:

determining that a first MD page of the plurality of MD pages is not in cache;

responsive to determining the first MD page is not in the cache, issuing a forwarding read command to a component to obtain the UD page and obtain the first MD page and one or more other MD pages of the plurality of MD pages that are subsequent to the first MD page in the consecutive order; and receiving, by the first code from the component, a response to the forwarding read command, wherein the response includes the UD page, the first MD page, and the one or more other MD pages subsequent to the first MD page in the consecutive order;

determining, by the first code, whether one MD page returned in the response to the forwarding read command includes invalid data, wherein the one MD page included in the response is a first version of the one MD page and a second version of the one MD page is stored in the cache, wherein the second version stored in the cache is a more recent version than the first version, wherein the second version includes second content stored at an address of interest in the one MD page stored in the cache and the first version includes first content stored at the address of interest, wherein the first content and the second content are different, and wherein the component uses the first content rather than the second content as a pointer to identify another MD page when performing processing to service the forwarding read command;

responsive to determining that the one MD page of the response includes invalid data issuing, by the first code, a second forwarding read command to the component to obtain one or more pages including a MD page pointed to or reference by the second content; and receiving, from the component, a second response to the second forwarding read command, wherein the second response includes a returned MD page pointed to or referenced by the second content.

* * * * *